(12) United States Patent
Nose et al.

(10) Patent No.: US 8,363,200 B2
(45) Date of Patent: Jan. 29, 2013

(54) DISPLAY ELEMENT, ELECTRONIC PAPER USING THE ELEMENT, AND ELECTRONIC TERMINAL USING THE ELEMENT

(75) Inventors: Masaki Nose, Kawasaki (JP); Junji Tomita, Kawasaki (JP); Tsuneo Watanuki, Kawasaki (JP); Toshiaki Yoshihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 290 days.

(21) Appl. No.: 12/390,809

(22) Filed: Feb. 23, 2009

(65) Prior Publication Data

US 2009/0161052 A1 Jun. 25, 2009

Related U.S. Application Data

(63) Continuation of application No. PCT/JP2006/316529, filed on Aug. 23, 2006.

(51) Int. Cl.
  *G02F 1/1339* (2006.01)
  *G02F 1/1347* (2006.01)
  *G02F 1/1341* (2006.01)

(52) U.S. Cl. .......... 349/154; 349/78; 349/156; 349/175; 349/189

(58) Field of Classification Search ............ 349/78, 349/154, 156, 175, 189
See application file for complete search history.

(56) References Cited

U.S. PATENT DOCUMENTS

| | | | |
|---|---|---|---|
| 5,037,185 A | 8/1991 | Grupp | |
| 5,946,070 A * | 8/1999 | Kohama et al. | 349/156 |
| 6,208,402 B1 | 3/2001 | Tajima | |
| 6,285,434 B1 * | 9/2001 | Ma et al. | 349/189 |
| 2002/0027630 A1 * | 3/2002 | Yamada et al. | 349/123 |
| 2002/0109812 A1 * | 8/2002 | Takami et al. | 349/113 |
| 2003/0071958 A1 * | 4/2003 | Wu et al. | 349/156 |
| 2004/0127282 A1 | 7/2004 | Naobayashi | |
| 2004/0223098 A1 | 11/2004 | Nose et al. | |

FOREIGN PATENT DOCUMENTS

| | | |
|---|---|---|
| JP | 58-13515 | 1/1983 |
| JP | 61-213827 A | 9/1986 |
| JP | 2-113223 A | 4/1990 |
| JP | 3-296724 A | 12/1991 |
| JP | 03296724 A | 12/1991 |
| JP | 7-143499 A | 6/1995 |
| JP | 8-76131 A | 3/1996 |
| JP | 11-153816 A | 6/1999 |
| JP | 2000-147527 A | 5/2000 |
| JP | 2001-183678 A | 7/2001 |
| JP | 2001-311952 A | 11/2001 |
| JP | 2002-82340 A | 3/2002 |
| JP | 2002-350863 A | 12/2002 |
| JP | 2004-201937 A | 7/2004 |
| JP | 2004-212535 A | 7/2004 |
| JP | 2004212535 A | 7/2004 |
| JP | 2004-219948 A | 8/2004 |
| WO | 03/050604 A1 | 6/2003 |

OTHER PUBLICATIONS

International Search Report of PCT/JP2006/316529, Mailing Date of Sep. 26, 2006.

(Continued)

*Primary Examiner* — Michael Caley
(74) *Attorney, Agent, or Firm* — Westerman, Hattori, Daniels & Adrian, LLP

(57) ABSTRACT

A display element comprises: a pair of substrates disposed opposite to each other; a liquid crystal enclosed between the pair of substrates; a wall structure which is formed to surround a pixel region and which is in contact with both of the pair of substrates; and an opening section which is an opening provided in a part of the wall structure to allow the liquid crustal to flow out of the pixel region.

20 Claims, 16 Drawing Sheets

OTHER PUBLICATIONS

International Search Report of PCT/JP2006/316529, date of mailing Sep. 26, 2006.

Japanese Office Action dated Mar. 13, 2012, issued in corresponding Japanese Patent Application No. 2008-530774.

* cited by examiner

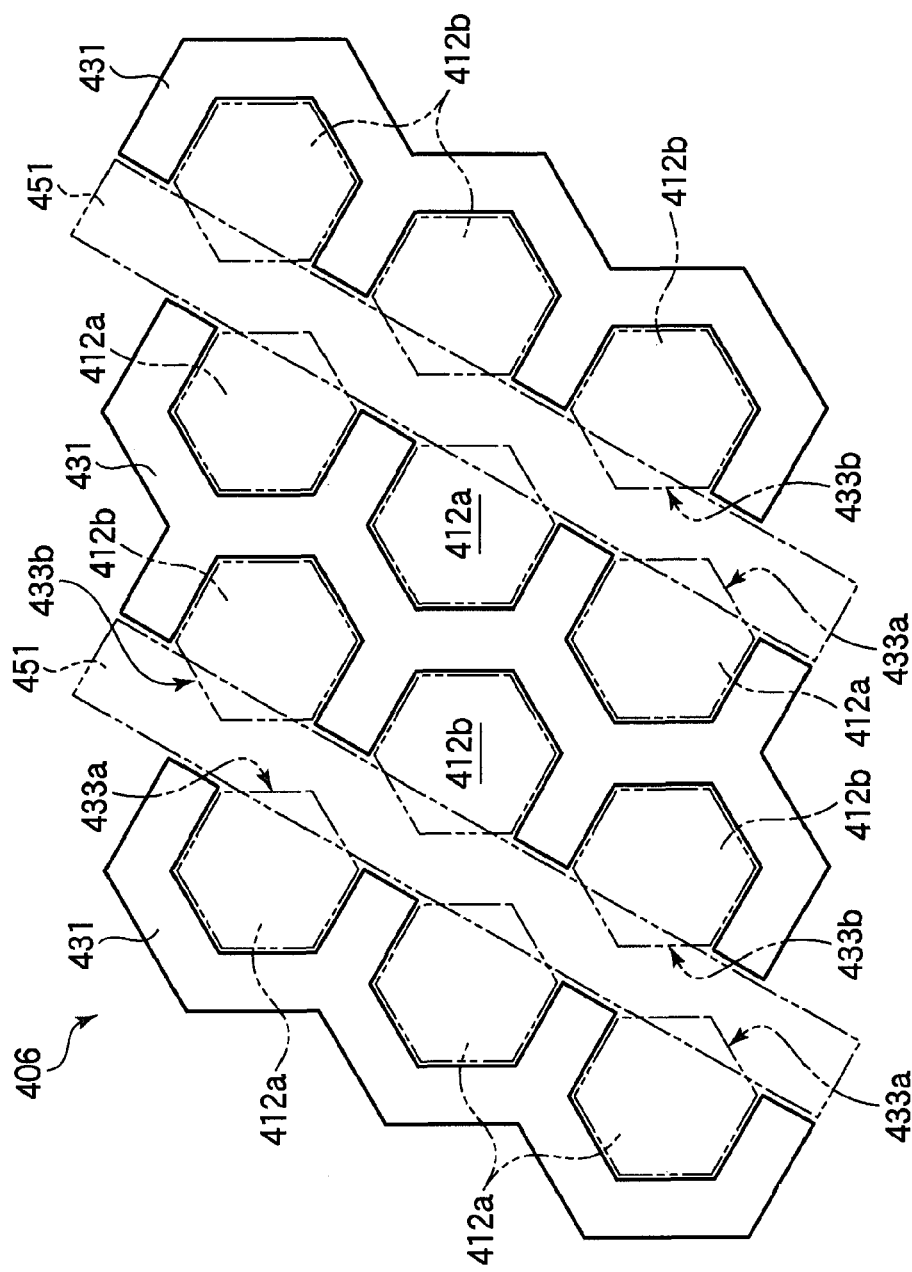

DISPLAY ELEMENT, ELECTRONIC PAPER USING THE ELEMENT, AND ELECTRONIC TERMINAL USING THE ELEMENT

CROSS REFERENCE TO RELATED APPLICATIONS

This application is a Continuation of International Application No. PCT/JP2006/316529, with an international filing date of Aug. 23, 2006, which designating the United States of America, the entire contents of which are incorporated herein by reference.

FIELD

The present invention relates to a display element, electronic paper using the element, and an electronic terminal using the element.

BACKGROUND

It is expected that the use of electronic paper allowing retention and electrical rewriting of displayed content without a power supply will rapidly spread in the near future. Electronic paper is a device allowing of electrical rewriting of displayed content which may replace existing printed paper media such as books, magazines, and newspapers. Electronic paper has the same excellent characteristics that printed paper media have, i.e., thinness, light weight, and clearness. Electronic paper is more advantageous than printed paper media in that it allows displayed content to be rewritten. For this reason, electronic paper is not thrown away after it is once used unlike printed paper media. The spread of electronic paper as a replacement for printed paper media will significantly contribute to the saving of paper resources, and electronic paper is therefore also considered very much advantageous from the point of view of environment protection. Possible applications of electronic paper include electronic books, electronic newspapers, electronic posters, and electronic dictionaries or the like.

Electronic paper must have properties such as (1) capability of electrical rewriting of displayed data, (2) ultra-low power consumption, (3) capability of displaying content in a manner comfortable and less tiresome for the eyes of a viewer, (4) high portability (the electronic paper must be lightweight and easy to carry), and (5) thinness and foldability like those of ordinary paper (the electronic paper must be lightweight and flexible).

Display methods employed for electronic paper include electrophoretic methods, twisting ball methods, methods utilizing an organic EL (electroluminescence) display, and methods utilizing a liquid crystal display or the like. Research and development of electronic paper using various display methods is in progress. The electrophoretic method is a method utilizing movement of charged particles in air or a liquid. The twisting ball method is a method utilizing rotation of charged particles which have two different colors. An organic EL display is a spontaneous light-emitting display having a structure formed by sandwiching a plurality of thin films made of an organic material with a cathode and an anode. A liquid crystal display element is a non-spontaneous light emitting display having a pair of substrates each having electrodes thereon and a liquid crystal layer formed by enclosing a liquid crystal between the pair of substrates. Methods of operating a liquid crystal display element include the TN (Twisted Nematic) method and the STN (Super Twisted Nematic) method.

One type of liquid crystal display elements used for electronic paper is liquid crystal displays utilizing a liquid crystal composition which forms a cholestetic phase (which is called as a cholesteric liquid crystal or a chiral nematic liquid crystal and which will be hereinafter referred to using the term "cholesteric liquid crystal"). A cholesteric liquid crystal has bistability (memory characteristics). Bistability is the property of a liquid crystal of exhibiting stability in two different states of alignment. A cholesteric liquid crystal can be put in either planar state or focal conic state by adjusting the intensity of an electric field applied thereto, and the liquid crystal stays in the state even when the electric field is thereafter removed.

In the planar state, light rays having predetermined wavelengths are selectively reflected. In the focal conic state, the property of selectively reflecting light rays is lost, and most of incident rays of light are transmitted. Thus, the amount of light reflected by a cholesteric liquid crystal can be controlled using the state of alignment of the liquid crystal molecules. Therefore, no polarizer is required for a liquid crystal display element utilizing a cholesteric liquid crystal. As apparent from above, a liquid crystal display element utilizing a cholesteric liquid crystal is a selective reflective liquid crystal display element. A liquid crystal display element utilizing a cholesteric liquid crystal has semi-permanent display retention characteristics (memory characteristics), and it is therefore capable of displaying an image without consuming power except for screen rewriting.

A liquid crystal display element utilizing a cholesteric liquid crystal capable of color display can be simply provided, for example, by stacking three liquid crystal display panels having cholesteric liquid crystals which reflect light rays having wavelengths of blue, green, and red, respectively, in the planar state. Therefore, the liquid crystal display method utilizing cholesteric liquid crystals is far more advantageous than other display methods such as the electrophoretic method when color display is desired. Brightness provided by the other display methods is only one-third of that achievable with the liquid crystal display method utilizing cholesteric liquid crystals because color filters for three colors must be disposed at each pixel according to the other methods. Therefore, improvement of brightness is a significant problem to be solved when electronic paper is provided according to the other display methods.

In general, glass substrates are used as the above-described substrates. Liquid crystal display elements using film substrates (plastic substrates) formed from a transparent special resin are also available. A liquid crystal display element using plastic substrates can be provided with a thickness and a weight smaller than those of a liquid crystal display element using glass substrates. Further, such an element has high durability and exhibits high strength against bending because it has high flexibility. Therefore, a liquid crystal display element using plastic substrates is preferably used as a display element of electronic paper which must be thin, light weight, and highly flexible.

In a liquid crystal display element, the thickness (cell gap) of a liquid crystal layer must be kept uniform (several μm). A liquid crystal display element according to the related art having a uniform cell gap will now be described with reference to FIG. 16. FIG. 16 is an exploded perspective view of a cell structure of a liquid crystal display element 906 having a dot matrix structure in which a uniform cell gap is achieved using columnar spacers. As shown in FIG. 16, the liquid crystal display element 906 includes a top substrate 7 and a bottom substrate 9 disposed opposite to each other and a liquid crystal layer (not shown) formed by enclosing a liquid crystal between the top substrate 7 and the bottom substrate 9.

A plurality of transparent column electrodes (not shown) are formed on a surface of the bottom substrate 9 facing the top substrate 7. A plurality of row electrodes (not shown) are formed on a surface of the top substrate 7 facing the bottom substrate 9 so as to intersect with the column electrodes perpendicularly thereto. Regions where the column and row electrodes overlap each other when viewed in the normal direction of substrate surfaces of the top substrate 7 and the bottom substrate 9 (hereinafter simply referred to as "normal direction of the substrate surfaces") constitute pixel regions. A seal material 21 is formed on a surface of the bottom substrate 9 facing the top substrate 7. The seal material 21 is a thermo-curing or UV-curing adhesive formed by a printing process. The seal material 21 is formed on a peripheral region of the element between the top substrate 7 and the bottom substrate 9. An opening section is provided in the middle of a shorter side 21b of the seal material 21 that is the right side of the material in the illustration of FIG. 16. Two ends of the opening section extend to form a liquid crystal injection port 21a. The liquid crystal display element 906 is configured such that a liquid crystal is injected into the region surrounded by the seal material 21 through the injection port 21a.

A plurality of adhesive pillars 905 serving as spacers for the liquid crystal layer are formed in the region on the bottom substrate 9 surrounded by the seal material 21. The adhesive pillars 905 are formed at four corners of each pixel region. The adhesive pillars 905 are cylindrical members which can be bonded to the top substrate 7. Therefore, when the bottom substrate 9 formed with the seal material 21 and the adhesive pillars 905 is combined with the top substrate 7, the top substrate 7 and the bottom substrate 9 are bonded by the seal material 21 and the adhesive pillars 905. For example, the adhesive pillars 905 may be formed using a photolithographic patterning process as disclosed in JP-UM-A-58-13515 and JP-A-8-76131.

The column electrodes and the row electrodes do not overlap in regions between the pixel regions when viewed in the normal direction of the substrate surfaces. In the liquid crystal display element 906 utilizing a cholesteric liquid crystal, the cholesteric liquid crystal in the inter-pixel regions is always in the planar state, and the inter-pixel regions are therefore always lit. In order to achieve high contrast by preventing the inter-pixel regions from being always kept lit, a black matrix 36 is formed on the surface of the top substrate 7 facing the bottom substrate 9. The black matrix 36 is formed like a grid such that inter-pixel regions are shaded.

A uniform cell gap is maintained in the liquid crystal display element 906 because the adhesive pillars 905 serve as spacers. A selective reflection type liquid crystal display element 906 can be obtained by injecting a cholesteric liquid crystal from the injection port 21a.

As described above, electronic paper must have flexibility. However, the liquid crystal display element 906 utilizing a cholesteric liquid crystal has had a problem in that it cannot be provided with sufficient flexibility although a uniform cell gap is achieved.

When the liquid crystal display panel in the liquid crystal display element 906 is bent or it is pressed on a display surface thereof, a state of display may change as a result of a movement of the liquid crystal attributable to the force applied by those actions on the element. In the case of a TN type or STN type liquid crystal display element, the liquid crystal is always in an electrically driven state. Therefore, even if there is a change in a state of display, the initial state of display can be immediately restored. In the case of the liquid crystal display element 906 utilizing a cholesteric liquid crystal having the property of memorizing a state of display, once a change occurs in a state of display, the initial state of display cannot be restored until the element is driven again.

For example, a method of forming pillars such as the adhesive pillars 905 in the liquid crystal display element 906 utilizing a cholesteric liquid crystal is disclosed in JP-A-2000-147527. However, the primary purpose of the method disclosed in JP-A-2000-147527 is to achieve uniformity of a cell gap, and the memory characteristics of the liquid crystal display element 906 utilizing a cholesteric liquid crystal is not maintained according to the method when the liquid crystal display panel is bent or pressed on the display surface thereof.

In order to allow a liquid crystal display element utilizing a cholesteric liquid crystal to be successfully applied to electronic paper, the element is required to have a structure which does not result in a change is a state of display when the electronic paper is pressed or bent. Such a structure is required not only for liquid crystal display elements utilizing a cholesteric liquid crystal but also for liquid crystal display elements utilizing a liquid crystal having the property of memorizing a state of display. A change occurred in a state of display of a liquid crystal display element 906 utilizing a cholesteric liquid crystal fabricated using film substrates having a thickness of 0.125 mm when the element was simply held by a hand. The pillared structure of the liquid crystal display element 906 necessitates a firm housing in order to prevent a change in a state of display. However, a liquid crystal display element 906 using such a housing could not be successfully applied to electronic paper which must have flexibility.

SUMMARY

A display element includes a pair of substrate disposed opposite to each other, a liquid crystal enclosed between the pair of substrates, a wall structure which is formed to surround pixel region and which is in contact with both of the pair of substrates, and an opening section which is an opening provided in a part of the wall structure to allow the liquid crystal to flow out of the pixel regions.

The object and advantages of the invention will be realized and attained by means of the elements and combination particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 14 is a schematic plan view of the liquid crystal display element 406 according to the third embodiment of the invention, schematically showing pixel regions 412a and 412b and a wall structure 431 in the normal direction of the substrate surfaces;

DESCRIPTION OF EMBODIMENTS

First Embodiment

A description will now be made with reference to FIGS. 1 to 9 on a display element, electronic paper utilizing the element, and an electronic terminal utilizing the element according to a first embodiment of the invention. The inventor has experimentally found out a mechanism which causes a change in a state of display of a liquid crystal display element 906 utilizing a cholesteric liquid crystal when a display surface of the element is pressed or bent. The mechanism is explained in international patent applications PCT/JP2004/013380 (international publication No. WO2006/030495) and PCT/JP2005/004925 previously filed by the inventor.

Such a change in a state of display is attributable to fluidity that the cholesteric liquid crystal exhibits in response to a pressing force applied to the display surface of the liquid crystal display element or when the liquid crystal display element is bent. A change in a state of display can be prevented by suppressing such fluidity significantly. The fluidity of the liquid crystal cannot be suppressed by a cylindrical or prismatic spacer structure. Although the use of pillars in a stripe structure for achieving a uniform cell gap has been proposed, such a structure will allow a liquid crystal to easily flow.

A description will now be made on a liquid crystal display element on which the present embodiment is premised. The inventor has proposed a liquid crystal display element in which a change in a state of display can be suppressed in international patent application PCT/JP2005/004925. The liquid crystal display element proposed in international patent application PCT/JP2005/004925 is similar to the liquid crystal display element 906 in that it includes a top substrate 7 and a bottom substrate 9 disposed opposite to each other and a liquid crystal enclosed between the top substrate 7 and the bottom substrate 9. A plurality of scan electrodes extending in parallel with each other are formed on a surface of the bottom substrate 9 facing the top substrate. A plurality of data electrodes are formed on a surface of the top substrate 7 facing the bottom substrate such that they perpendicularly intersect the plurality of scan electrodes when viewed in the normal direction of the substrate surfaces. The plurality of data electrodes extend in parallel with each other.

Figure 1:
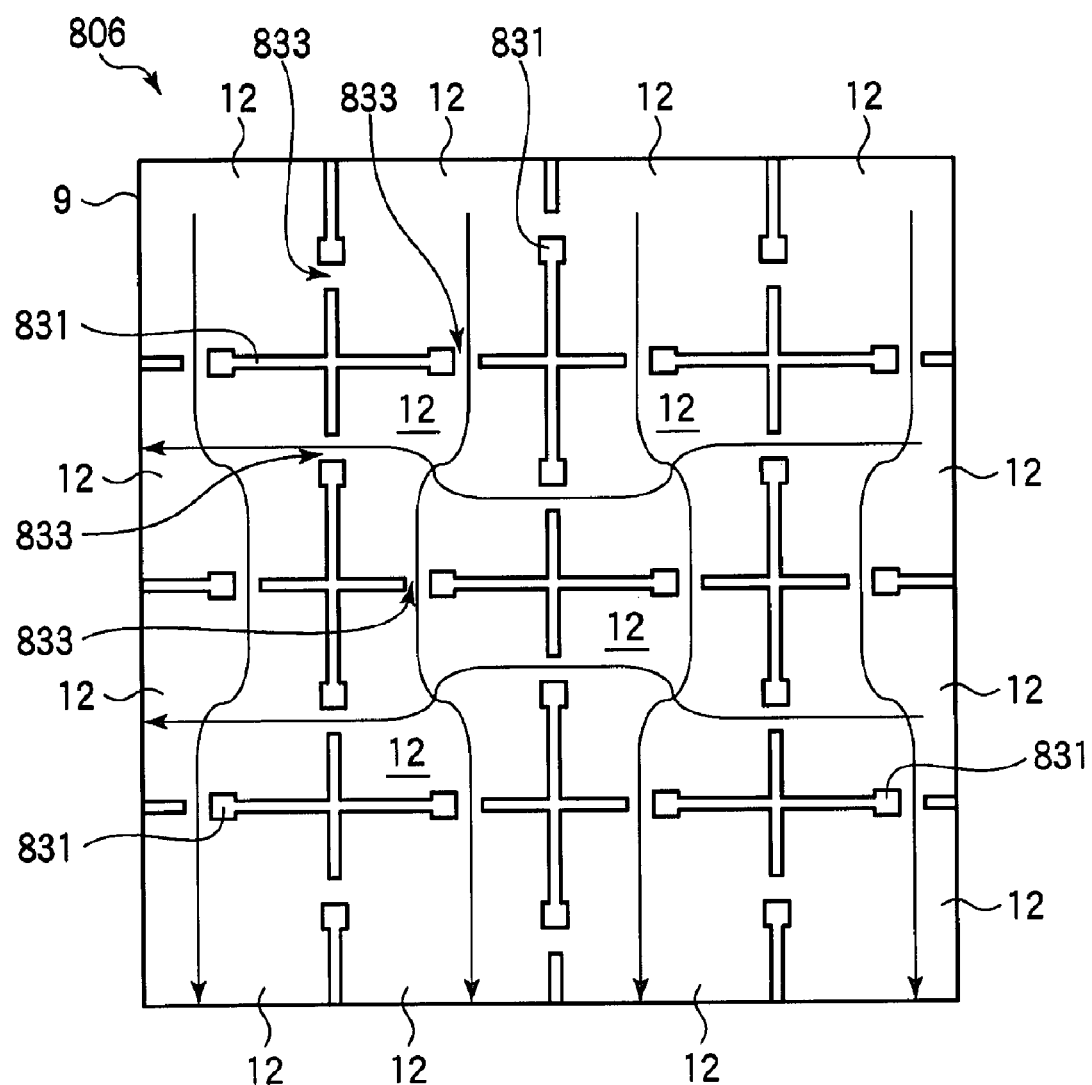
FIG. 1 is a plan view of a liquid crystal display element 806 proposed in international patent application PCT/JP2005/004925 showing a configuration of the element viewed in the normal direction of substrate surfaces thereof.

FIG. 1 is a plan view of a liquid crystal display element 806 proposed in international patent application PCT/JP2005/004925 showing a configuration of the element viewed in the normal direction of substrate surfaces thereof. Regions where scan electrodes and data electrodes overlap when viewed in the normal direction of the substrate surfaces constitute pixel regions 12. Let us define that a pixel region means a liquid crystal layer in a region where a scan electrode and a data electrode overlaps each other in the following description. As shown in FIG. 1, a plurality of pixel regions 12 are disposed in the form of a matrix. FIG. 1 shows sixteen pixel regions 12.

The liquid crystal display element 806 is characterized in that wall structures 831 are formed instead of the adhesive pillars 905 in the liquid crystal display element 906. The wall structures 831 are formed on the bottom substrate 9 and are in contact with the top substrate 7 (not shown in FIG. 1). When viewed in the normal direction of the substrate surfaces, each wall structure 831 is substantially in the form of two cross bars having different lengths. The wall structures 831 are members having adhesive properties. One pixel region 12 is surrounded by four wall structures 831. The center of a wall structure 831 is located at a corner of a pixel region 12.

An opening section 833 is formed between each pair of wall structures 831 which are adjacent to each other. Both ends of the shorter bar of each wall structure 831 face ends of the longer bars of adjacent wall structures 831 across opening sections 833. Both ends of the longer bar of each wall structure face ends of the shorter bars of adjacent wall structures across opening sections 833. An opening section 833 is formed near the center of each of four sides of each pixel region 12. One pixel region 12 is contiguous with four opening sections 833. Pixel regions 12 adjacent to each other are connected through an opening section 833.

In the liquid crystal display element 806, since each of four sides of pixel region 12 is surrounded by wall structures 833 except in the regions where opening sections 833 are provided, the movement of the liquid crystal in the pixel regions 12 is limited. As a result, a change in a display state of the pixels can be suppressed even when a pressing force is applied to a display surface of the liquid crystal display element 806 or when the liquid crystal display element 806 is bent.

However, some movement of the liquid crystal still remains in the liquid crystal display element 806, and a change in a state of display can therefore occur when the element is pressed or bent or when there is an abrupt temperature change. The cause of the movement will now be described with reference to FIG. 1. In the liquid crystal display element 806, an opening section 833 is formed at each of four sides of a pixel region 12. Therefore, as schematically indicated by arrows in FIG. 1, liquid crystal channels are formed through a plurality of opening sections 833 to extend across a plurality of pixel regions 12 in row and column directions. The channels extend inside the pixel regions 12. Therefore, possibility remains for the liquid crystal in the pixel regions 12 of the liquid crystal display element 806 to move around. Thus, the liquid crystal in the pixel regions 12 moves when the element is pressed or bent or when there is a temperature change, which can result in a change in a state of display of the element.

At the 12th International Display Workshops/Asia Display 2005 (IDW/AD'05), a method of improving the durability of the liquid crystal display element by completely surrounding the pixel region with wall structures provided on four sides thereof has been disclosed. According to the method, since a pixel region is completely surrounded by wall structures on four sides thereof, no liquid crystal channel extending across a plurality of pixel regions will be formed. There will be no movement of the liquid crystal attributable to a press or bend imparted thereto, and no change will therefore occur in a state of display. According to this method, however, a special process such as an inkjet process must be used to inject a liquid crystal material. For example, for the purpose of allowing smoother ejection of a liquid crystal using an inkjet process, it has been proposed to mix the liquid crystal with an organic solvent and to evaporate the organic solvent after dispensing the liquid crystal mixed with the organic solvent to each pixel region. However, the reliability of a liquid crystal display element can be degraded when the liquid crystal material of the same is mixed with an organic material. The commonly-used vacuum injection method has been proved to be most advantageous among liquid crystal injection methods in terms of reliability. In general, a liquid crystal has a thermal expansion coefficient higher than that of wall structures. Therefore, when a pixel region is completely surrounded by wall structures on four sides thereof, the liquid crystal in the pixel region is completely enclosed by the wall structures, and the wall structures can be broken as a result thermal expansion of the liquid crystal.

A liquid crystal display element according to the present embodiment is more advantageous in preventing a change in a display state than the liquid crystal display element 806. Further, the liquid crystal of a liquid crystal display element according to the present embodiment can be injected using the vacuum injection method.

Figure 2:
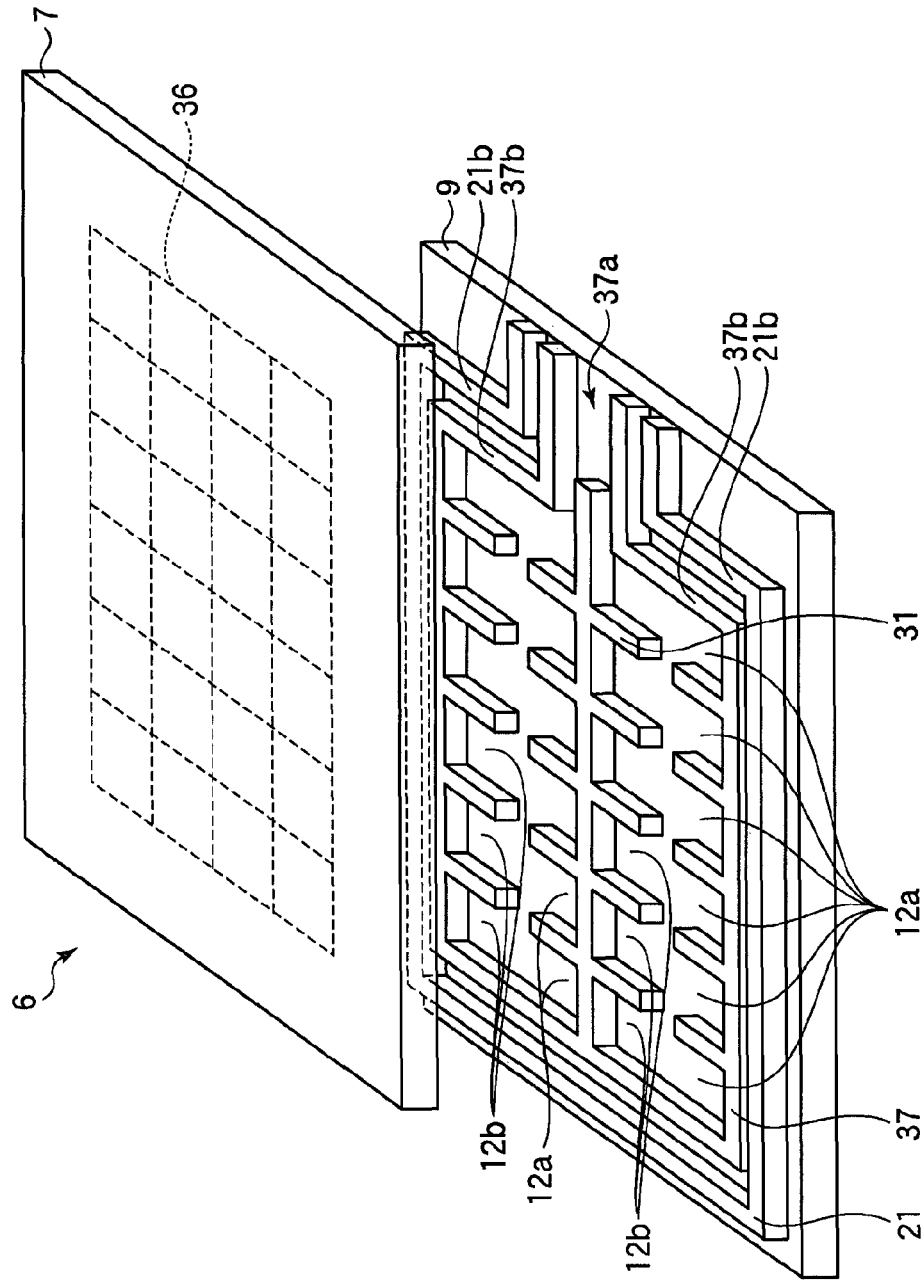
FIG. 2 is an exploded perspective view of a liquid crystal display element 6 according to a first embodiment of the invention schematically showing a configuration of the same.

A liquid crystal display element according to the present embodiment will now be described with reference to FIGS. 2 to 7. FIG. 2 is an exploded perspective view of a liquid crystal display element 6 according to the present embodiment schematically showing a configuration of the same. Broken lines in FIG. 2 represent hidden lines. In contrast to the liquid crystal display element 806, the liquid crystal display element 6 is characterized in that liquid crystal channels are formed outside pixel regions 12a and 12b. The liquid crystal display element 6 is also different from the liquid crystal display element 806 or characterized by the structure of wall structures 31.

As shown in FIG. 2, the liquid crystal display element 6 includes a top substrate 7 and a bottom substrate 9 (a pair of substrates) disposed opposite to each other and a liquid crystal layer (not shown) formed by enclosing a cholesteric liquid crystal between the top substrate 7 and the bottom substrate 9. For example, film substrates (plastic substrates) made of polycarbonate (PC) or polyetherlene terephthalate (PET) are used as the top substrate 7 and the bottom substrate 9.

A plurality of scan electrodes 17 extending in parallel with each other (not shown in FIG. 2) are formed on a surface of the bottom substrate 9 facing the top substrate. On a surface of the top substrate 7 facing the bottom substrate, a plurality of data electrodes 19 (not shown in FIG. 2) are formed such that they perpendicularly intersect with the plurality of scan electrodes 17 when viewed in the normal direction of the substrate surfaces. The plurality of data electrodes 19 extend in parallel with each other.

Figure 3:
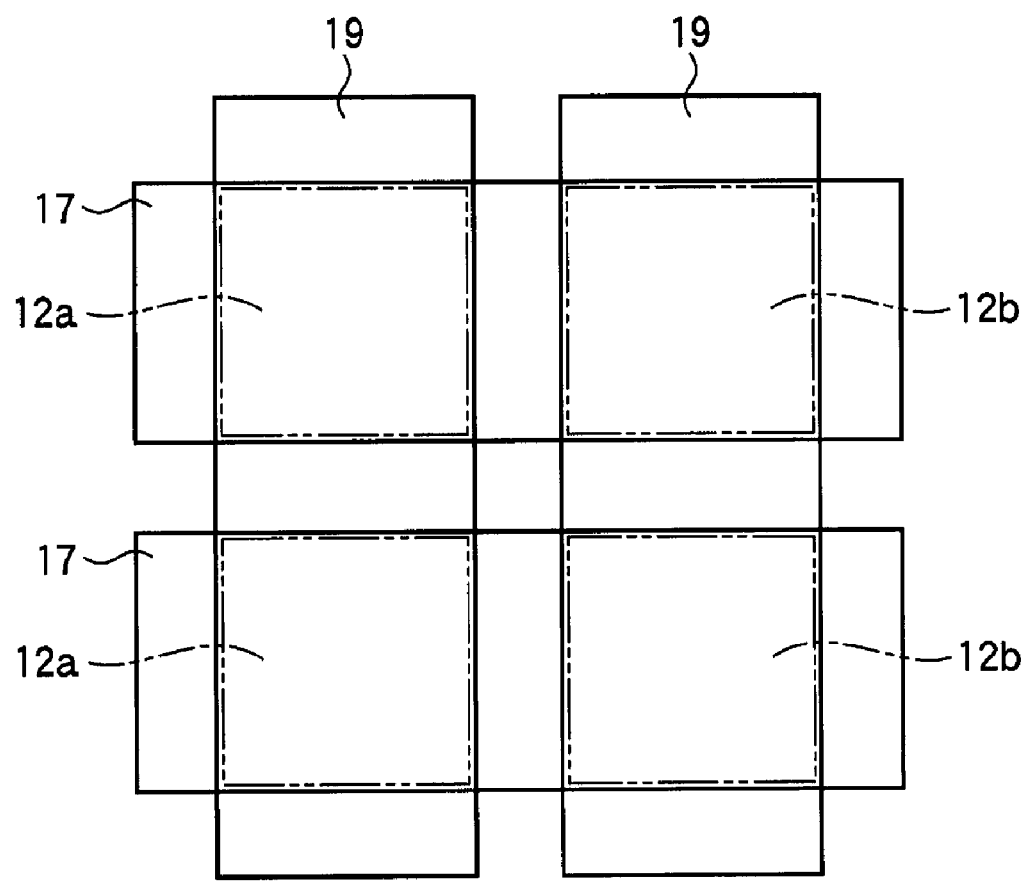
FIG. 3 is a plan view of scan electrodes 17 and data electrodes 19 taken in the normal direction of substrate surfaces.

FIG. 3 is a plan view of the scan electrodes 17 and the data electrodes 19 taken in the normal direction of the substrate surfaces. Regions where the scan electrodes 17 and the data electrodes 19 overlap each other when viewed in the normal direction of the substrate surfaces as shown in FIG. 3 constitute pixel regions 12a and 12b. The pixel regions 12a and 12b are substantially square when viewed in the normal direction of the substrate surfaces. Therefore, the pixel regions 12a and 12b have four sides. As shown in FIGS. 2 and 3, a plurality of pixel regions 12a and 12b are alternately disposed in the form of a matrix.

As shown in FIG. 2, a wall structure 31 is formed between the pixel regions 12a and 12b on the bottom substrate 9 and the scan electrodes 17 so as to surround the pixel regions 12a and 12b. A second wall structure 37 is also formed on the bottom substrate 9 to surround the plurality of pixel regions 12a and 12b and the wall structure 31. The second wall structure 37 defines an outer frame of a region into which a liquid crystal is injected. The second wall structure 37 has a substantially rectangular shape when viewed in the normal direction of the substrate surfaces. An opening section is provided in the middle of a shorter side 37b of the second wall structure 37 that is shown on the right side of FIG. 2. Two ends of the opening section extend to form a liquid crystal injection port 37a. A cholesteric liquid crystal is injected into the region surrounded by the second wall structure 37 through the injection port 37a.

The wall structure 31 and the second wall structure 37 are members having adhesive properties. For example, the wall structure 31 and the second wall structure 37 are made of a photo-resist. The wall structure 31 and the second wall structure 37 are fabricated using, for example, photolithography. The wall structure 31 and the second wall structure 37 may be formed as a unitary member. In this case, those parts may be simultaneously formed at a photolithographic process.

The adhesive properties of the wall structure 31 and the second wall structure 37 can be manifested as follows. The bottom substrate 9 formed with the wall structure 31 and the second wall structure 37 is combined with the top substrate 7 before post-baking is performed on the wall structure 31 and the second wall structure 37. After the bottom substrate 9 is combined with the top substrate 7, the post-baking is performed on the wall structure 31 and the second wall structure 37. Thus, the adhesive properties of the wall structure 31 and the second wall structure 37 can be manifested depending on the material from which the wall structure 31 and the second wall structure 37 are formed.

A seal material 21 is formed outside the second wall structure 37 on the bottom substrate 9 at a predetermined distance from the structure 37. The seal material 21 is a thermo-curing or UV-curing resin adhesive which is provided, for example, using a printing process. The seal material 21 is formed at a peripheral region between the top substrate 7 and the bottom substrate 9 to surround the plurality of pixel regions 12a and 12b, the wall structure 31, and the second wall structure 37. An opening section is provided in the middle of a shorter side 21b of the seal material 21 that is shown on the right side of FIG. 2. Two ends of the opening section extend to form the liquid crystal injection port 37a in conjunction with the second wall structure 37. The liquid crystal display element 6 has a configuration in which the wall structure 31 and the second wall structure 37 having adhesive properties can be used in combination with the seal material 21 in combining the top substrate 7 and the bottom substrate 9. That is, the top substrate 7 and the bottom substrate 9 are bonded by the seal material 21, the wall structure 31, and the second wall structure 37. The wall structure 31 and the second wall structure 37 may alternatively be used in combination with spherical spacers or columnar spacers according to the related art.

As will be apparent from the above description, in the liquid crystal display element 6 utilizing a cholesteric liquid crystal, the cholesteric liquid crystal is always in the planar state in regions between the pixel regions 12a and 12b, and the element is therefore always lit in the regions between the pixel regions 12a and 12b. Thus, in order to improve the contrast of pixels by preventing the regions between the pixel regions 12a and 12b from being always lit, a black matrix 36 is formed on the surface of the top substrate 7 facing the bottom substrate 9. As shown in FIG. 2, the black matrix 36 is provided in the form of a grid for shading the regions between the pixel regions 12a and 12b. The black matrix 36 is formed in such positions that it overlaps the wall structure 31 and the second wall structure 37 when viewed in the normal direction of the substrate surfaces. The wall structure 31 and the second wall structure 37 are bonded to both of the bottom substrate 9 and the black matrix 36 on the top substrate 7. The black matrix 36 is also formed at a viewer's side of a channel 51. The black matrix 36 blocks reflected light from the channel 51.

Figure 4:
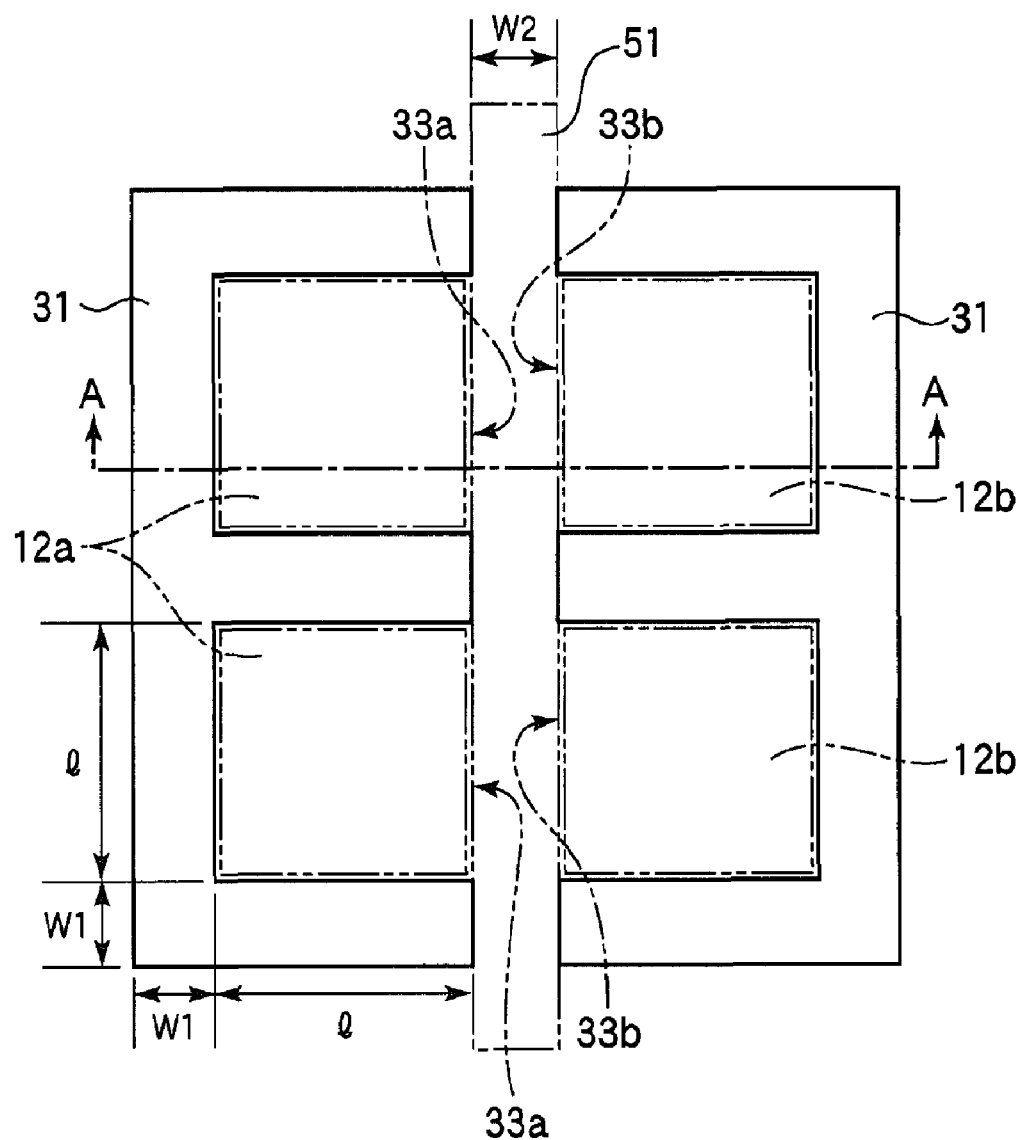
FIG. 4 is a schematic plan view of the liquid crystal display element 6 according to the first embodiment of the invention, schematically showing pixel regions 12a and 12b and a wall structure 31 in the normal direction of the substrate surfaces.
Figure 5:
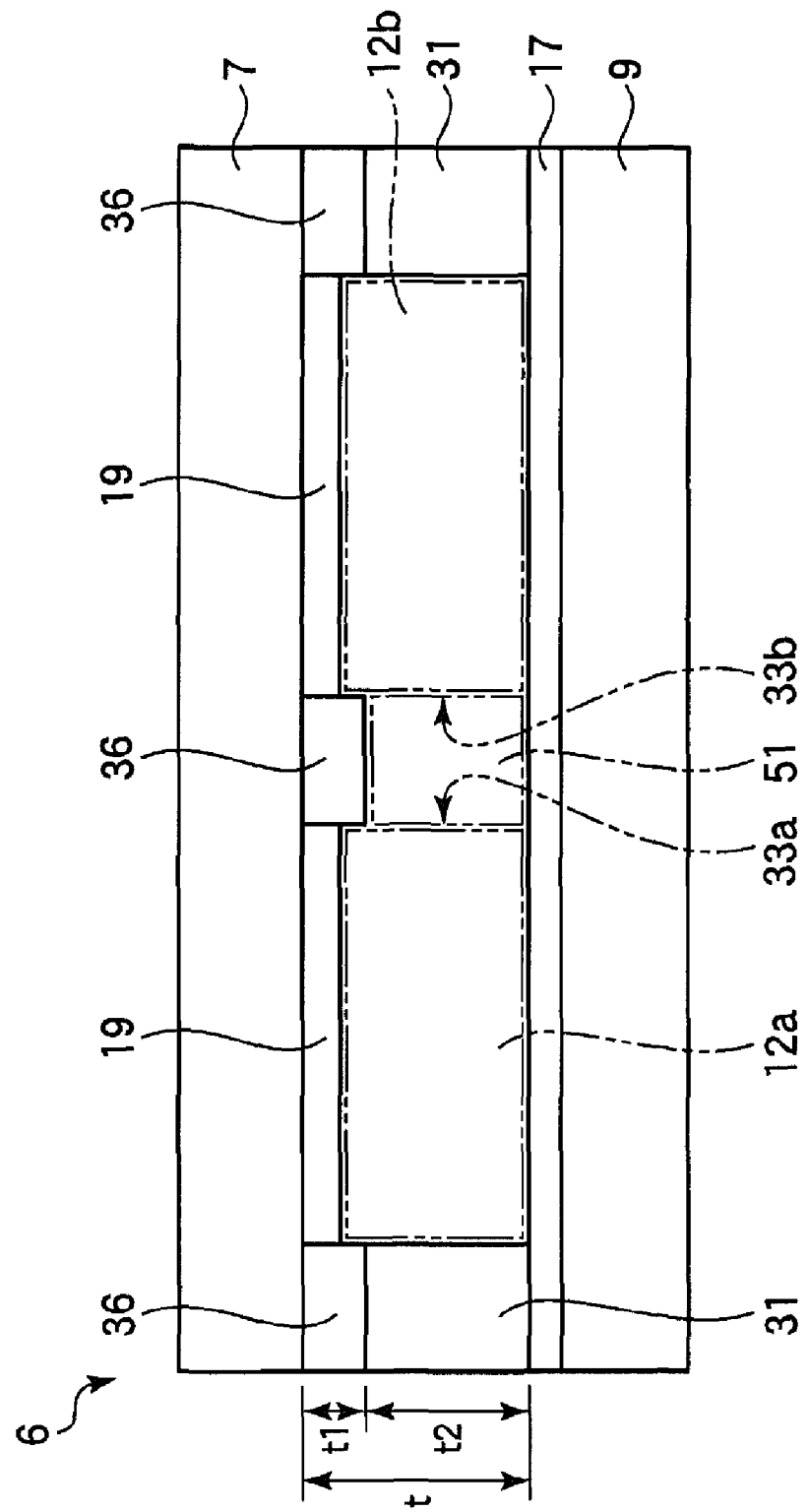
FIG. 5 is a sectional view taken along the line A-A in FIG. 4.

FIG. 4 is a schematic plan view of pixel regions 12a and 12b and the wall structure 31 taken in the normal direction of the substrate surfaces. FIG. 4 shows four pixel regions, i.e., two each pixel regions 12a and 12b. FIG. 5 is a sectional view taken along the line A-A in FIG. 4. The liquid crystal display element 6 has a structure formed by periodically disposing pixel regions 12a and 12b, a wall structure 31, openings 33a and 33b, and a channel 51 as shown in FIG. 4. As shown in FIGS. 4 and 5, each couple of pixel regions 12a and 12b are disposed to adjoin each other in the horizontal direction of FIG. 5. Each pixel region 12a is laterally enclosed by the wall structure 31 except on a right side thereof in FIG. 4. Each pixel region 12b is laterally enclosed by the wall structure 31 except on a left side thereof as shown in FIG. 4. A channel 51 is formed between the pixel regions 12a and 12b to allow the cholesteric liquid crystal to flow. The channel 51 is formed outside the pixel regions 12a and 12b. The channel 51 extends in the vertical direction of FIG. 4.

An opening section 33a, which is an opening in the wall structure 31, is formed on the side (right side in FIG. 4) of each pixel region 12a facing the channel 51. An opening section 33b, which is an opening in the wall structure 31, is formed on the side (left side in FIG. 4) of each pixel region 12b facing the channel 51. One opening section 33a is formed for each pixel region 12a, and one opening section 33b is formed for each pixel region 12b. The opening sections 33a and 33b are disposed to face each other across the channel 51. The pixel regions 12a are connected to the channel 51 through the opening sections 33a. The pixel regions 12b are connected to the channel 51 through the opening sections 33b.

For example, the pixel regions 12a and 12b have a length l along one side thereof (pixel size) as described below, and the wall structure 31 has a width w1 as described below. When the liquid crystal display element 6 has a diagonal dimension of 3.8 inches and 100 pixels per inch (ppi), the length l of one side of the pixel regions 12a and 12b is, for example, 210 µm, and the width w1 of the wall structure 31 is, for example, 30 µm. When the liquid crystal display element 6 has a diagonal dimension of 11 inches and 36 pixels per inch (ppi), the length l of one side of the pixel regions 12a and 12b is, for example, 690 µm, and the width w1 of the wall structure 31 is, for example, 10 µm. The width of the opening sections 33a and 33b is equal to the length l of one side of the pixel regions 12a and 12b. For example, the channel 51 has a width w2 which is equal to the width w1 of the wall structure 31.

As shown in FIG. 5, the liquid crystal display element 6 has a call gap t which is substantially determined by the sum of the thickness (represented by t1) of the black matrix 36 and the thickness (represented by t2) of the wall structure 31. For example, the cell gap t satisfies an expression "3 µm≦t≦10 µm". For example, the thickness t1 of the black matrix 36 satisfies an expression "t1≦1 µm". The wall structure 31 or the channel 51 is formed directly under the black matrix 36.

The pixel regions 12a and 12b are laterally surrounded and enclosed by the wall structure 31 and the black matrix 36 except at the opening sections 33a and 33b. Therefore, the liquid crystal in the pixel regions 12a and 12b can move out of the pixel regions 12a and 12b only through the opening sections 33a and 33b.

The wall structure 31 is bonded to both of the black matrix 36 and the bottom substrate 9 (or the scan electrodes 17). In general, a liquid crystal has a thermal expansion coefficient greater than that of a wall structure. Therefore, when the wall structure 31 has no adhesive property, a gap may be formed between the wall structure 31 and the black matrix 36 as a result of thermal expansion of the liquid crystal attributable to a temperature change or the like. In such a case, the liquid crystal in some pixel regions 12a and 12b can move into other pixel regions 12a and 12b through such a gap. Thus, the liquid crystal freely moves between the top substrate 7 and the bottom substrate 9, and a significant change consequently occurs in a state of display. In the present embodiment, the wall structure 31 has adhesive properties, and the structure 31 is bonded to both of the black matrix 36 and the bottom substrate 9. It is therefore possible to prevent any movement of the liquid crystal attributable to thermal expansion. Thus, the liquid crystal display element 6 can be prevented from undergoing a change in a state of display due to an abrupt temperature change.

Figure 6:
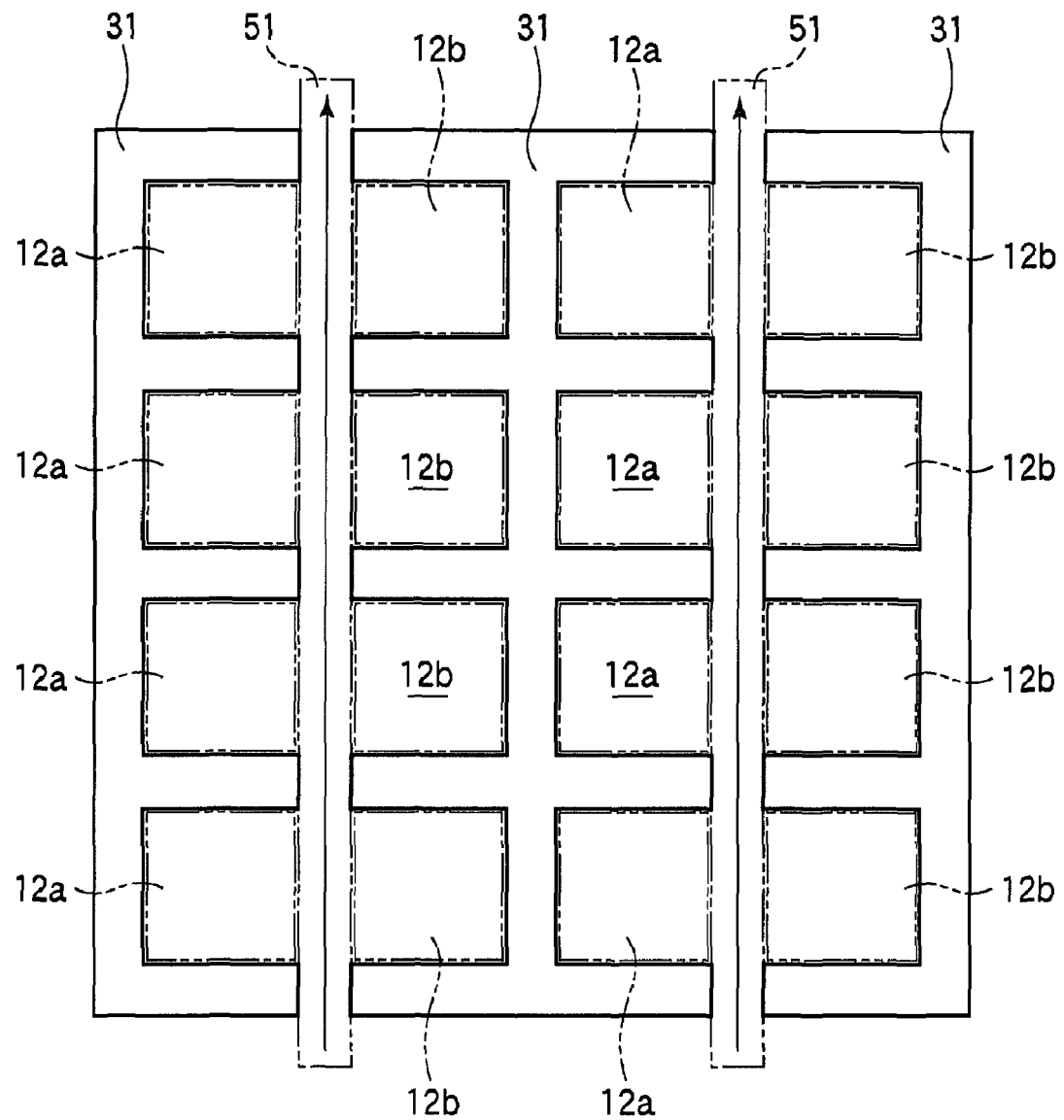
FIG. 6 is a plan view taken in the normal direction of the substrate surfaces showing the pixel regions 12a and 12b and the wall structure 31 in an area wider than that shown in FIG. 4.

FIG. 6 is a plan view of the element taken in the normal direction of the substrate surfaces showing the pixel regions 12a and 12b and the wall structure 31 in an area wider than that shown in FIG. 4. FIG. 6 shows sixteen pixel regions, i.e., eight each pixel regions 12a and 12b. An injection port 37a is formed in a position which would be at the bottom of FIG. 6 if illustrated (the port is not illustrated in FIG. 6). The pixel regions 12a and 12b are connected to the injection port 37a through the channel 51. When a cholesteric liquid crystal is injected from the injection port 37a using, for example, vacuum injection, the injected liquid crystal proceeds the channel 51 as schematically indicated by the arrows, and all pixel regions 12a and 12b are filled with the liquid crystal supplied through the channel 51. Thus, the channel 51 serves as a liquid crystal channel for filling all pixel regions 12a and 12b with the liquid crystal. After the liquid crystal is injected, the injection port 37a is sealed with a sealing material to complete the liquid crystal display element 6. The liquid crystal of the liquid crystal display element 6 of the present embodiment can be injected using vacuum injection that is considered reliable.

When the liquid crystal display element 6 is bent in the vertical direction of FIG. 6, a resultant flow of the liquid crystal is limited to the channels 51 extending in the vertical direction of FIG. 6. Since the channels 51 are located outside the pixel regions 12a and 12b, the bend of the liquid crystal display element 6 has substantially no influence on the liquid crystal in the pixel regions 12a and 12b. Therefore, any change in a state of display of the liquid crystal display element 6 can be prevented when the element is bent in the vertical direction of FIG. 6. When the liquid crystal display element 6 is bent in the horizontal direction of FIG. 6, a resultant flow of the liquid crystal is confined in pairs of pixel regions 12a and 12b adjoining each other in the horizontal direction of FIG. 6 across the channels, and the liquid crystal in the pairs of pixel regions 12a and 12b will not flow into other pixel regions 12a and 12b. That is, substantially no flow of the liquid crystal occurs. Therefore, the liquid crystal display element 6 can be prevented from undergoing a change in a state of display thereof when it is bent in the horizontal direction of FIG. 6.

As thus described, a flow of the liquid crystal in the vertical direction of FIG. 6 is limited by the channels 51, and a flow of the liquid crystal in the horizontal direction of FIG. 6 is confined in pairs of liquid crystals 12a and 12b. The description similarly applies to a flow of the liquid crystal that occurs when the display surface of the liquid crystal display element 6 is pressed. Therefore, the liquid crystal display element 6 can be prevented from undergoing a change in a state of display thereof when the display surface is pressed.

As thus described, the liquid crystal display element 6 of the present embodiment can be prevented from undergoing a change in a state of display thereof even when the display surface is pressed or bent or when there is an abrupt temperature change. The liquid crystal display element 6 of the present embodiment can therefore achieve high display quality.

In the liquid crystal display element 6 of the present embodiment, one opening section 33a is formed at each pixel region 12a, and one opening section 33b is formed at each pixel region 12b. Thus, the element 6 is different from the liquid crystal display element 806 in that no liquid crystal channel is formed inside the pixel regions 12a and 12b. The liquid crystal display element 6 is more advantageous than the liquid crystal display element 806 in preventing a change in a state of display attributable to pressing or bending of the display surface.

In the liquid crystal display element 6 of the present embodiment, an opening section 33a is formed at each pixel region 12a, and an opening section 33b is formed at each pixel region 12b. The pixel regions 12a and 12b are not completely surrounded by the wall structure 31 on the four sides thereof. Therefore, even if there is thermal expansion of the liquid crystal attributable to a temperature change, the liquid crystal in the pixel regions 12a and 12b can move into the channels 51. Therefore, the wall structure 31 will not be broken by thermal expansion of the liquid crystal.

Figure 7:
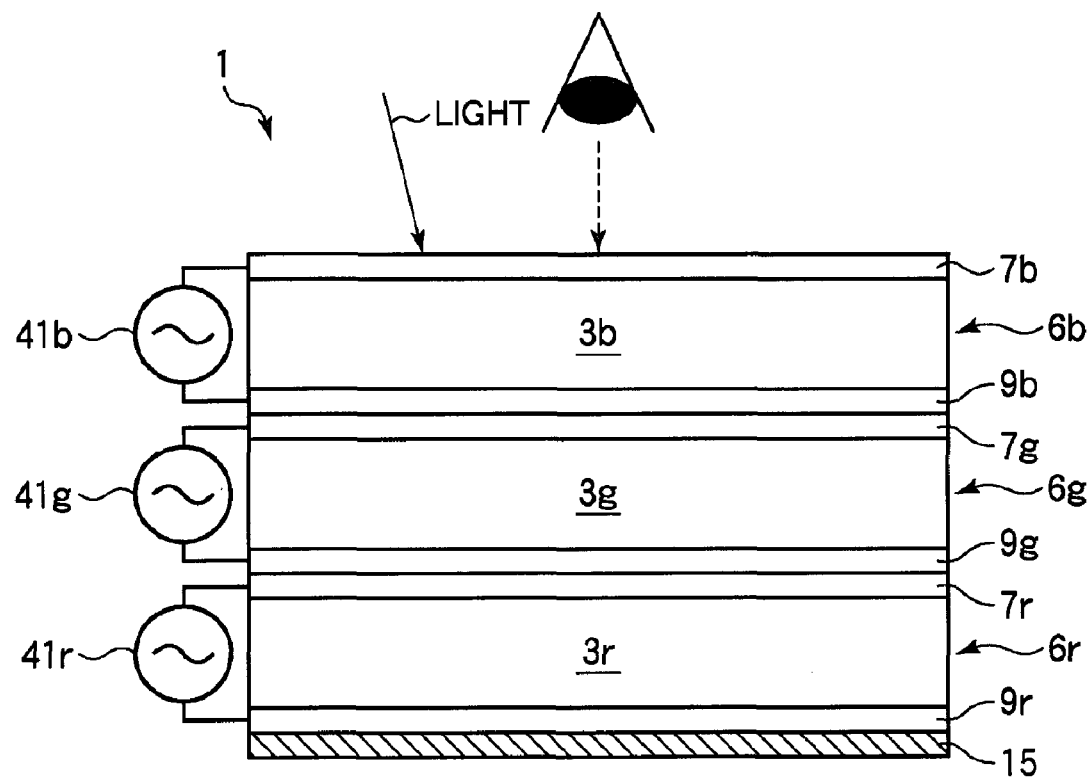
FIG. 7 schematically shows a sectional configuration of a liquid crystal display element 1 according to the first embodiment of the invention.

FIG. 7 schematically shows a sectional configuration of a liquid crystal display element 1 capable of full-color display utilizing cholesteric liquid crystals. The liquid crystal display element 1 has a structure formed by stacking liquid crystal display elements 6 into three layers. The three liquid crystal display elements 6 constitute a blue (B) display portion 6b, a green (G) display portion 6g, and a red (R) display portion 6r which are listed in the order of their closeness to a display surface of the element 1. The display surface is located above the uppermost substrate in the illustration or a top substrate 7b, and external light (indicated by the arrow in a solid line) impinges on the display surface from above the top substrate 7b. An eye of a viewer and the viewing direction of the viewer (indicated by the arrow in a broken line) are schematically shown above the top substrate 7b.

The B display portion 6b includes a blue (B) liquid crystal layer 3b formed between a pair of substrates, i.e., a top substrate 7b and a bottom substrate 9b and a pulse voltage source 41b for applying a predetermined pulse voltage to the B liquid crystal layer 3b. The B liquid crystal layer 3b includes a cholesteric liquid crystal which reflects blue light in the planar state. The G display portion 6g includes a green (G) liquid crystal layer 3g formed between a pair of substrates, i.e., a top substrate 7g and a bottom substrate 9g and a pulse voltage source 41g for applying a predetermined pulse voltage to the G liquid crystal layer 3g. The G liquid crystal layer 3g includes a cholesteric liquid crystal which reflects green light in the planar state. The R display portion 6r includes a red (R) liquid crystal layer 3r formed between a pair of substrates, i.e., a top substrate 7r and a bottom substrate 9r and a pulse voltage source 41r for applying a predetermined pulse voltage to the R liquid crystal layer 3r. The R liquid crystal layer 3r includes a cholesteric liquid crystal which reflects red light in the planar state. A light absorbing layer 15 is disposed on a bottom surface of the bottom substrate 9r of the R display portion 6r.

A cholesteric liquid crystal tends to require a higher driving voltage, the shorter the wavelength of light reflected by the liquid crystal. A smaller cell gap necessitates a lower driving voltage. Therefore, driving voltages for the liquid crystal layers 3b, 3g, and 3r may be made equal to each other by providing the liquid crystal layers 3b, 3g, and 3r with different cell gaps among which the cell gap of the B liquid crystal layer 3b is smallest.

The liquid crystal display element 1 has memory characteristics, and it is capable of bright and vivid full-color display without consuming electric power except when screen rewriting is performed. Although not shown, black-and-white display (monochrome display) can be performed by a liquid crystal display element provided, for example, by stacking a liquid crystal display element 6 having a cholesteric liquid crystal reflecting blue light in the planar state and a liquid crystal display element 6 having a cholesteric liquid crystal reflecting yellow light in the planar state.

As described above, according to the present embodiment of the invention, the liquid crystal display elements 1 and 6 utilizing cholesteric liquid crystals having bistability can be more effectively prevented from undergoing a change in a state of display when the display surface is bent or pressed or when there is an abrupt temperature change. Further, since improved strength against pressing and bending is achieved, the liquid crystal display elements 1 and 6 utilizing cholesteric liquid crystals can be provided with flexibility.

The liquid crystal display elements 1 and 6 of the present embodiment have high flexibility and high resistance to shock and a press on the display surface thereof. Therefore, the liquid crystal elements 1 and 6 are preferably used as display elements of electronic paper. Electronic paper utilizing the liquid crystal display element 1 or 6 may be used as an electronic book, electronic newspaper, electronic poster, or an electronic dictionary. The liquid crystal display element 1 and 6 of the present embodiment are preferably used as display elements of portable apparatus, such as PDAs (Personal Data Assistants) as portable terminals or wrist watches, which must have flexibility and a wide storage temperature range. The liquid crystal elements 1 and 6 may be used in display apparatus in various fields such as displays of paper type computers which are expected to be realized in the future and displays for decorative exhibition of stores and the like.

A modification of the liquid crystal display element of the present embodiment will now be described with reference to FIGS. 8 and 9. In the following description, components which are identical in functions and operations between the present modification and the liquid crystal display element 6 shown in FIGS. 2 and 6 will be indicated by like reference numerals and will not be described in detail.

(First Modification)

A liquid crystal display element according to a first modification of the present embodiment will now be described with reference to FIG. 8. FIG. 8 is a plan view of the liquid crystal display element of the present modification, and it is a schematic view of pixel regions 12a, 12b, 12c, and 12d and a wall structure 3 taken in the normal direction of substrate surfaces of the element. The liquid crystal display element of the present modification has a structure formed by periodically disposing pixel regions 12a, 12b, 12c, and 12d, a wall structure 31, screen sections 32a and 32b, opening sections 33a, 33b, 33c, and 33d, and a channel 51 as shown in FIG. 8. Referring to FIG. 8, the pixel region 12c is disposed under the pixel region 12a in FIG. 8, and the pixel region 12d is disposed under the pixel region 12b in FIG. 8. The pixel regions 12c and 12d are disposed adjacent to each other in the horizontal direction of FIG. 8.

The liquid crystal display element of the present modification is characterized in that the wall structure 31 includes the screen sections 32a and 32b and in that the opening sections 33a, 33b, 33c, and 33d therefore have a width l2 which is narrowed by the screen sections 32a and 32b unlike those in the liquid crystal display element 6 shown in FIGS. 2 to 6. The liquid crystal display element of the present modification is similar in configuration to the liquid crystal display element 6 except that the wall structure 31 has the screen sections 32a and 32b and that the opening sections 33a, 33b, 33c, and 33d have the width l2 which is narrowed by the screen sections 32a and 32b.

Figure 8:
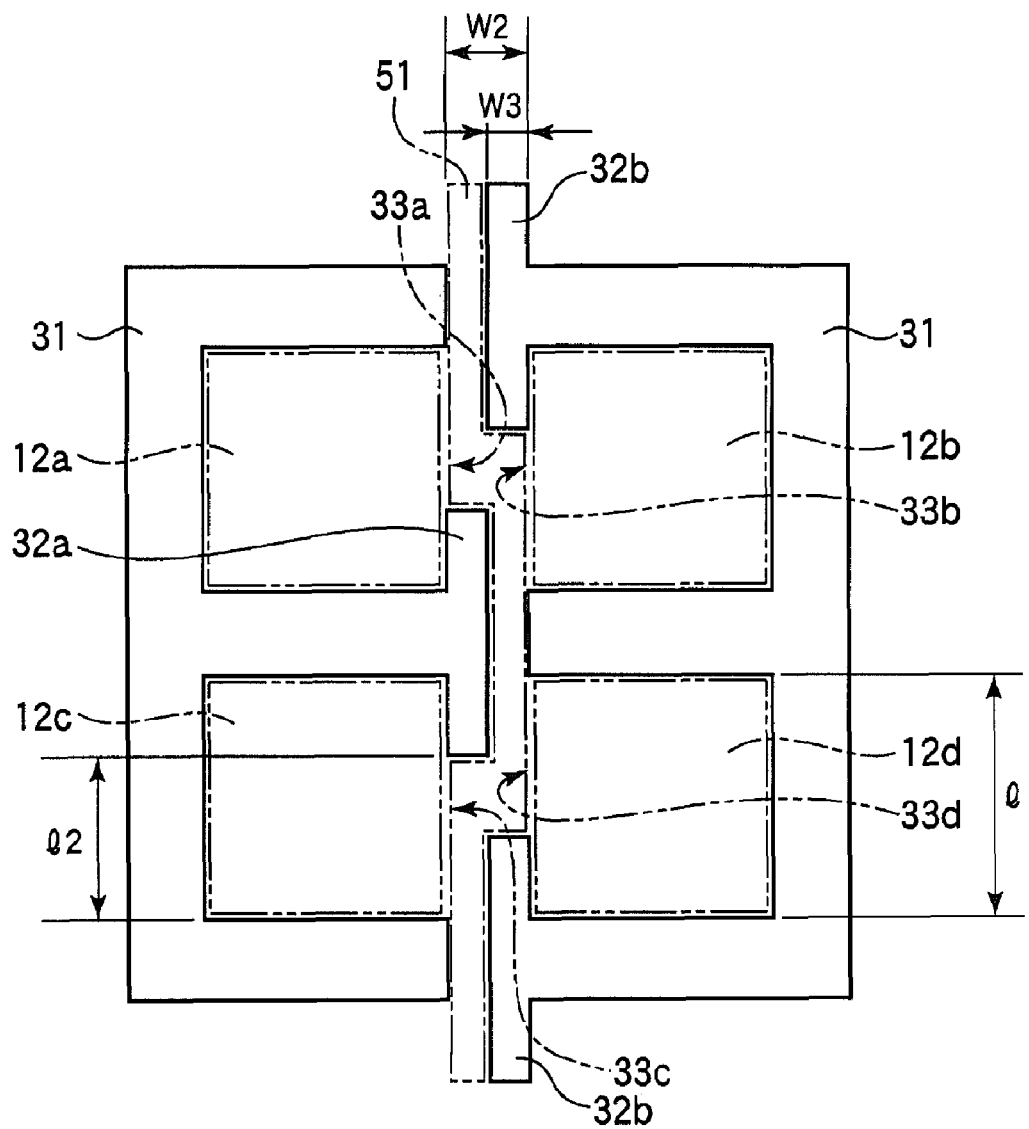
FIG. 8 is an illustration of a modification (first modification) of the liquid crystal display element 6 according to the first embodiment of the invention.

The pixel regions 12a and 12c are laterally surrounded by the wall structure 31 except on a right side thereof as shown in FIG. 8. The pixel regions 12ba and 12d are laterally surrounded by the wall structure 31 except on a left side thereof as shown in FIG. 8. The screen sections 32a and 32b are formed integrally with the wall structure 31. The screen sections 32a and 32b are formed from the same material, at the same manufacturing step, and in the same layer as the wall structure 31. A channel 51 is formed to extend between the pixel regions 12a and 12b and between the pixel regions 12c and 12d.

The screen section 32a is formed on the same side of the pixel regions 12a and 12c where the opening sections 33a and 33c are formed. The screen section 32a is formed near the bottom right corner of the pixel region 12a in FIG. 8 and near the top right corner of the pixel region 12c in FIG. 8. Since the screen section 32a is thus formed, the width l2 of the opening sections 33a and 33c is smaller than the width l of the opening sections 33a and 33b shown in FIG. 4. One screen section 32a is formed for each pair of pixel regions 12a and 12c.

The screen section 32b is formed on the same side of the pixel regions 12b and 12d where the opening sections 33b and 33d are formed. The screen section 32b is formed near the top left corner of the pixel region 12b in FIG. 8 and near the bottom left corner of the pixel region 12d in FIG. 8. Since the screen section 32ba is thus formed, the width l2 of the opening sections 33b and 33d is smaller than the width l of the opening sections 33a and 33b shown in FIG. 4. One screen section 32b is formed for each pair of pixel regions 12b and 12d.

For example, the width l2 of the opening sections 33a, 33b, 33c, and 33d is two-thirds of the length (represented by l) of one side of the pixel regions 12a, 12b, 12c, and 12d. The width l2 of the opening sections 33a, 33b, 33c, and 33d may be still smaller. When viewed in the direction perpendicular to the extending direction of the channel 51 (the horizontal direction of FIG. 8), the screen sections 32a and 32b have a width w3 which is, for example, one half of a width w2 of the channel 51. In the present modification, since the screen sections 32a and 32b are formed, the width of the channel 51 is partially narrowed.

In the present modification, the screen sections 32a and 32b are formed on one side of the respective opening sections 33a, 33b, 33c, and 33d, and the width l2 of the opening sections 33a, 33b, 33c, and 33d is therefore smaller than the width l of the opening sections 33a and 33b shown in FIG. 4. As a result, in the liquid crystal display element of the present modification, movement of the liquid crystal in the pixel regions 12a, 12b, 12c, and 12d can be more effectively limited when compared to the liquid crystal display element 6 shown in FIGS. 2 to 6. Therefore, the liquid crystal display element of the present modification is more effective than the liquid crystal display element 6 in preventing a change in a state of display attributable to pressing or bending of the display surface or an abrupt temperature change. Movement of the liquid crystal in the pixel regions 12a, 12b, 12c, and 12d can be more effectively limited, the smaller the width l2 of the opening sections 33a, 33b, 33c, and 33d.

(Second Modification)

A liquid crystal display element according to a second modification of the present embodiment will now be described with reference to FIG. 9. FIG. 9 is a plan view of the liquid crystal display element of the present modification, and it is a schematic view of pixel regions 12a and 12b and a wall structure 31 taken in the normal direction of substrate surfaces of the element. The liquid crystal display element of the present modification is characterized in that the wall structure 31 includes screen sections 132a and 132b and in that opening sections 33a and 33b have a width l3 which is narrowed by the screen sections 132a and 132b unlike those in the liquid crystal display element 6 shown in FIGS. 2 to 6. The liquid crystal display element of the present modification is similar in configuration to the liquid crystal display element 6 except that the wall structure 31 has the screen sections 132a and 132b and that the opening sections 33a and 33b have the width l3 which is narrowed by the screen sections 132a and 132b.

The screen sections 132a and 132b are formed integrally with the wall structure 31. The screen sections 132a and 132b are formed from the same material, at the same manufacturing step, and in the same layer as the wall structure 31.

The screen sections 132a are formed on the same side as the side of the pixel regions 12a where the opening sections 33a are formed. The screen sections 132a are formed near the top right and bottom right corners of the pixel regions 12a in FIG. 9. Since the screen sections 132a are thus formed, the width l3 of the opening sections 33a is smaller than the width l of the opening sections 33a and 33b shown in FIG. 4. One screen section 132a is formed for each pixel region 12a. The screen section 132a and the opening section 33a associated with a pixel region 12a are line symmetric about an imaginary line extending in the horizontal direction of FIG. 9 through the center of the pixel region 12a.

The screen sections 132b are formed on the same side as the side of the pixel region 12b where the opening sections 33b are formed. The screen sections 132b are formed near the top left and bottom left corners of the pixel regions 12b in FIG. 9. Since the screen sections 132b are thus formed, the width l3 of the opening sections 33b is smaller than the width l of the opening sections 33a and 33b shown in FIG. 4. One screen section 132b is for each pixel region 12b. The screen section 132b and the opening section 33b associated with a pixel region 12b are line symmetric about an imaginary line extending in the horizontal direction of FIG. 9 through the center of the pixel region 126.

Figure 9:
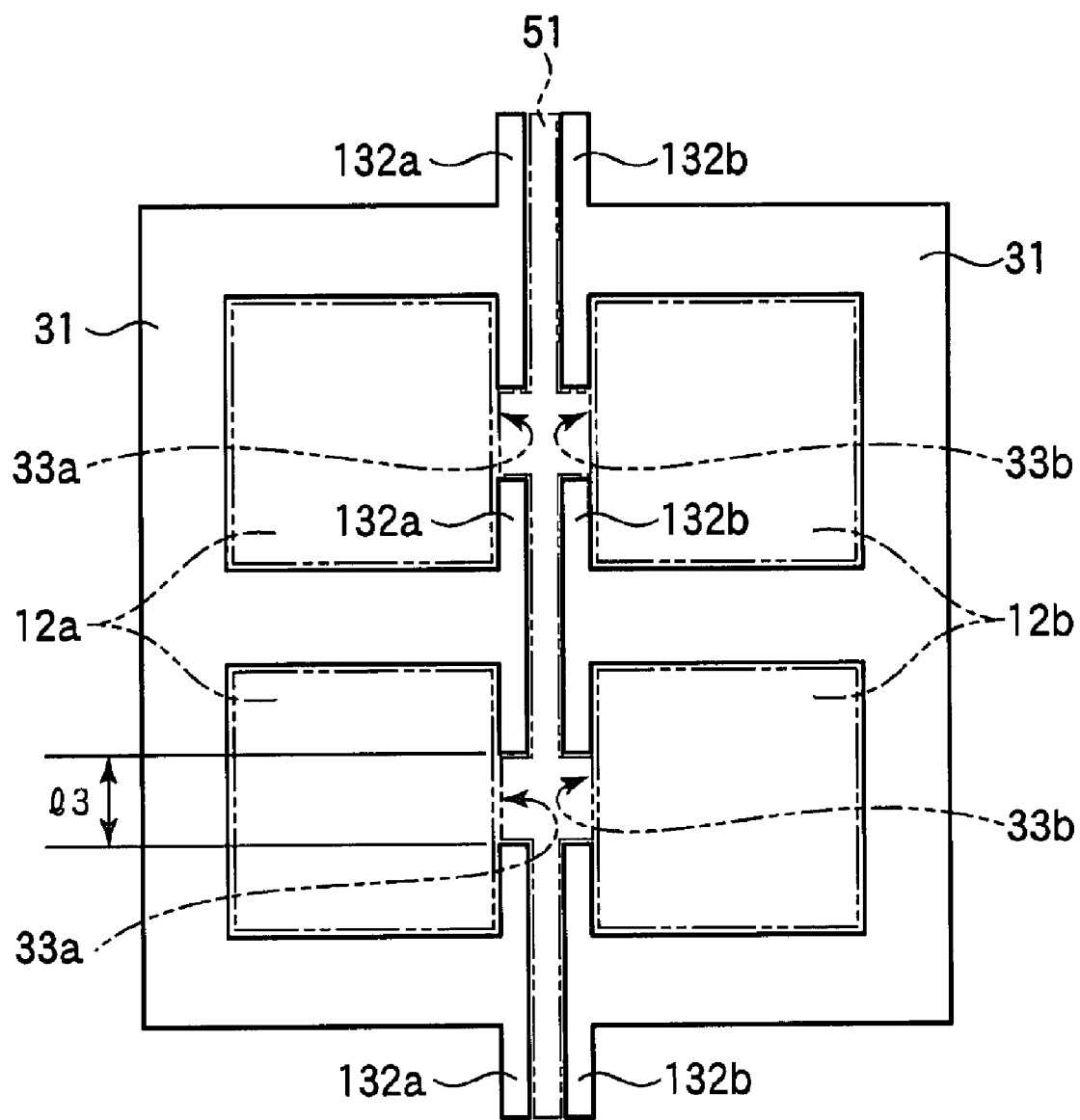
FIG. 9 is an illustration of another modification (second modification) of the liquid crystal display element 6 according to the first embodiment of the invention.

The screen sections 132a and 132b are formed line symmetrically about an imaginary line extending in the vertical direction of FIG. 9 through the center of a channel 51. In the present modification, since the screen sections 132a and 132b are thus formed, the width of the channel 51 is partially narrowed.

The width l3 of the opening sections 33a and 33b can be narrowed to about 10 μm. For example, the width l3 of the opening sections 33a and 33b may be set as follows. In the case of a liquid crystal display element having a diagonal dimension of 3.8 inches and 100 pixels per inch, the width l3 of the opening sections 33a and 33b is, for example, 30 μm. In the case of a liquid crystal display element having a diagonal dimension of 11 inches and 36 pixels per inch, the width l3 of the opening sections 33a and 33b is, for example, 10 μm.

In the present modification, screen sections 132a are formed on both sides of each opening section 33a, and screen sections 132b are formed on both sides of each opening section 33b. Therefore, the width l3 of the opening sections 33a and 33b is smaller than the width l of the opening sections 33a and 33b shown in FIG. 4. As a result, in the liquid crystal display element of the present modification, movement of the liquid crystal can be more effectively limited when compared to the liquid crystal display element 6. Therefore, the liquid crystal display element of the present modification is more effective than the liquid crystal display element 6 in preventing changes in a state of display attributable to pressing or bending of the display surface or an abrupt temperature change. Movement of the liquid crystal can be more effectively limited, the smaller the width l3 of the opening sections 33a and 33b.

Second Embodiment

Figure 10:
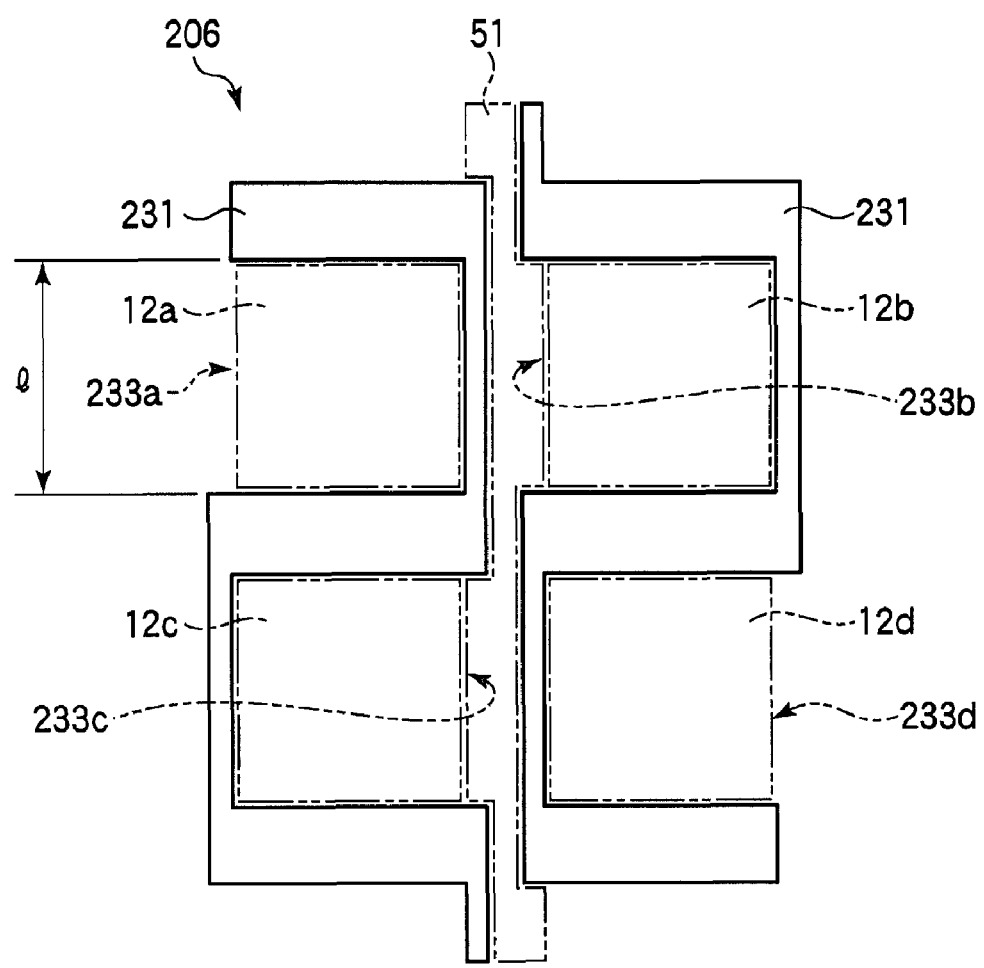
FIG. 10 is a schematic plan view of a liquid crystal display element 206 according to a second embodiment of the invention, schematically showing pixel regions 12a, 12b, 12c, and 12d and a wall structure 231 in the normal direction of the substrate surfaces.

A liquid crystal display element according to a second embodiment of the invention will now be described with reference to FIGS. 10 to 12. FIG. 10 is a plan view of a liquid crystal display element 206 of the present embodiment, and it is a schematic view of pixel regions 12a, 12b, 12c, and 12d and a wall structure 231 taken in the normal direction of substrate surfaces of the element 206.

The liquid crystal display element 206 of the present embodiment has a structure formed by periodically disposing pixel regions 12a, 12b, 12c, and 12d, a wall structure 231, opening sections 233a, 233b, 233c, and 233d, and a channel 51 as shown in FIG. 10.

The pixel regions 12a are laterally surrounded by the wall structure 231 except on a left side thereof as shown in FIG. 10. The pixel regions 12b are laterally surrounded by the wall structure 231 except on a left side thereof as shown in FIG. 10. The pixel regions 12c are laterally surrounded by the wall structure 231 except on a right side thereof as shown in FIG. 10. The pixel regions 12d are laterally surrounded by the wall structure 231 except on a right side thereof as shown in FIG. 10. A channel 51 for allowing a cholesteric liquid crystal to flow is formed between the pixel regions 12a and 12b and between the pixel regions 12c and 12d.

Opening sections 233a, which are openings on the wall structure 231, are formed on the side (left side in FIG. 10) of the pixel regions 12a facing the channel 51 (not shown in FIG. 10). Opening sections 233b, which are openings on the wall structure 231, are formed on the side (left side in FIG. 10) of the pixel regions 12b facing the channel 51 (not shown in FIG. 10). Opening sections 233c, which are openings on the wall structure 231, are formed on the side (right side in FIG. 10) of the pixel regions 12c facing the channel 51 (not shown in FIG. 10). Opening sections 233d, which are openings on the wall structure 231, are formed on the side (right side in FIG. 10) of the pixel regions 12d facing the channel 51 (not shown in FIG. 10). The pixel regions 12a, 12b, 12c, and 12d are connected to the channel 51 through the openings sections 233a, 233b, 233c, and 233d, respectively.

In the liquid crystal display element 6 of the first embodiment, the opening sections 33a and 33b of two pixel regions 12a and 12b adjoining each other across a channel 51 are disposed to face each other across the channel 51. On the contrary, the opening sections 233a and 233b of two pixel regions 12a and 12b adjoining each other in the horizontal direction of FIG. 10 across a channel 51 are not disposed to face each other across the channel 51. The wall structure 231 is formed on the side (right side in FIG. 10) of the pixel region 12a facing the channel 51, and an opening 233b is formed on the side (left side in FIG. 10) of the pixel region 12b facing the channel 51.

Similarly, the opening sections 233c and 233d of two pixel regions 12c and 12d adjoining each other in the horizontal direction of FIG. 10 across a channel 51 are not disposed to face each other across the channel 51. An opening section 233c is formed on the side (right side in FIG. 10) of the pixel region 12c facing the channel 51, and the wall structure 231 is formed on the side (left side in FIG. 10) of the pixel region 12d facing the channel 51. The liquid crystal display element 206 is similar in configuration to the liquid crystal display element 6 of the first embodiment except the above-described point.

Figure 11:
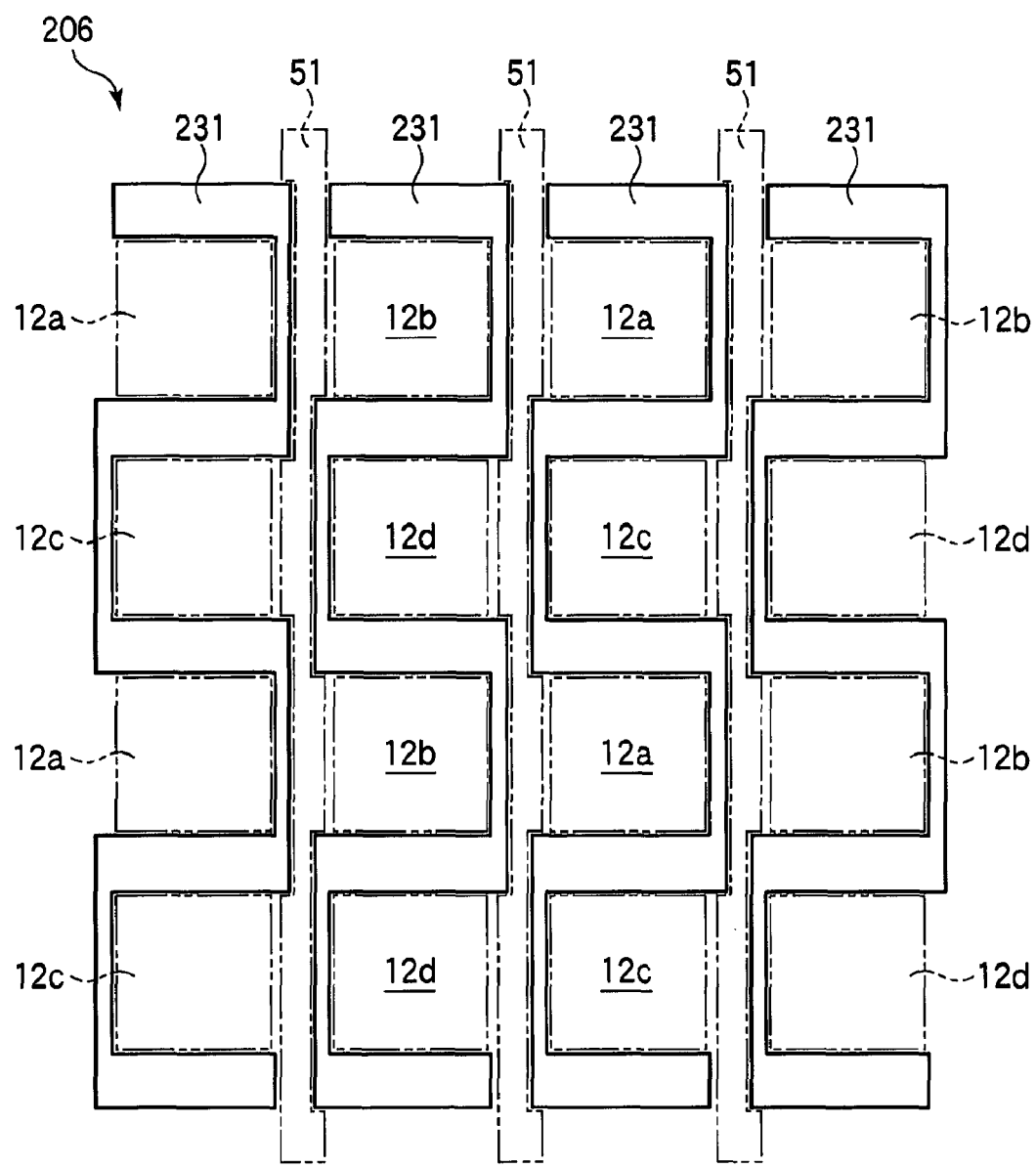
FIG. 11 is a plan view taken in the normal direction of the substrate surfaces showing the pixel regions 12a, 12b, 12c, and 12d and the wall structure 231 in an area wider than that shown in FIG. 10.
Figure 12:
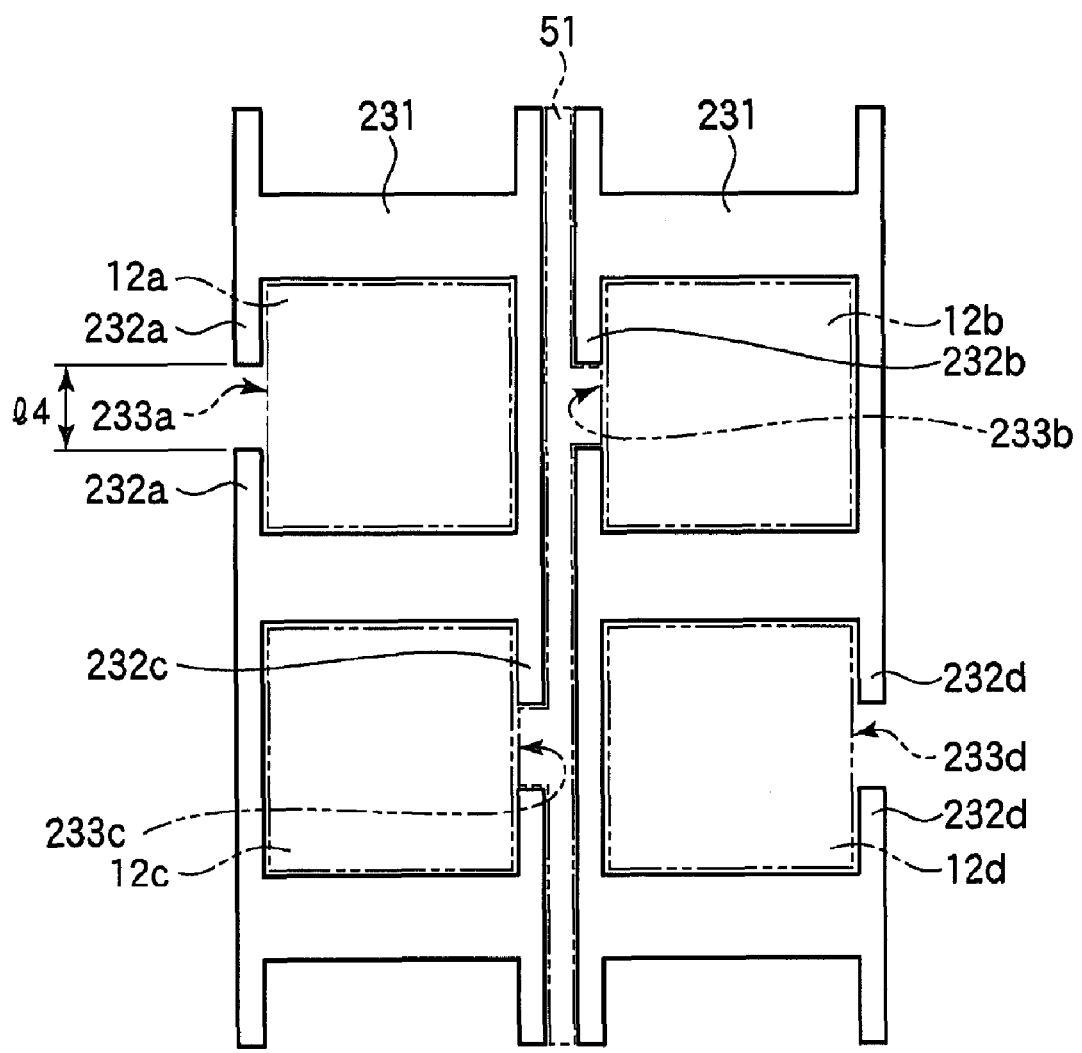
FIG. 12 is an illustration of a modification of the liquid crystal display element 206 according to the second embodiment of the invention.

FIG. 11 is a plan view of the element 206 taken in the normal direction of the substrate surfaces showing the pixel regions 12a, 12b, 12c, and 12d and the wall structure 231 in an area wider than that shown in FIG. 10. FIG. 11 shows sixteen pixel regions, i.e., four each pixel regions 12a, 12b, 12c, and 12d. In the liquid crystal display element 206 of the present embodiment, the opening sections 233a and 233b are not disposed to face each other across a channel 51, and the opening sections 233c and 233d are not disposed to face each other across a channel 51. Therefore, when the liquid crystal display element 206 is bent in the horizontal direction of FIG. 11, a resultant movement of the liquid crystal is confined in each of the pixel regions 12a, 12b, 12c, and 12d, and the liquid crystal in each of the pixel regions 12a, 12b, 12c, and 12d will not move into other pixel regions 12a, 12b, 12c, and 12d. Therefore, the liquid crystal display element 206 of the present embodiment is more effective than the liquid crystal display element 6 of the first embodiment in preventing a change in a state of display when the element 206 is bent in the horizontal direction of FIG. 11. In other aspects, the liquid crystal display element 206 of the present embodiment has advantages similar to those of the liquid crystal display element 6 of the first embodiment.

(Modification)

A liquid crystal display element according to a modification of the present embodiment will now be described with reference to FIG. 12. In the following description, components identical in configurations and operations between the present modification and the liquid crystal display element 206 shown in FIGS. 10 and 11 are indicated by like reference numerals and will not be described in detail. FIG. 12 is a plan view of the liquid crystal display element of the present modification, and it is a schematic view of pixel regions 12a, 12b, 12c, and 12d and a wall structure 231 taken in the normal direction of substrate surfaces of the element.

When compared to the liquid crystal display element 206, the liquid crystal display element of the present modification is characterized in that the wall structure 231 includes screen sections 232a, 232b, 232c, and 232d and in that opening sections 233a, 233b, 233c, and 233d have a width l4 which is narrowed by the screen sections 232a, 232b, 232c, and 232d. The liquid crystal display element of the present modification is similar in configuration to the liquid crystal display element 206 except that the wall structure 231 includes the screen sections 232a, 232b, 232c, and 232d and in that the width l4 of the opening sections 233a, 233b, 233c, and 233d is narrowed by the screen sections 232a, 232b, 232c, and 232d.

The screen sections 232a, 232b, 232c, and 232d are formed integrally with the wall structure 231. The screen sections 232a, 232b, 232c, and 232d are formed from the same material, at the same manufacturing step, and in the same layer as the wall structure 231.

The screen sections 232a are formed on the same side as the side of the pixel regions 12a where the opening sections 233a are formed. Screen sections 232a are formed near top left and bottom left corners of a pixel region 12a in FIG. 12. Since the screen sections 232a are thus formed, the opening section 233a has a width l4 smaller than the width l of the opening section 233a shown in FIG. 10. The screen sections 232a and the opening section 233a are line symmetrical about an imaginary line extending in the horizontal direction of FIG. 12 through the center of the pixel region 12a. The screen sections 232b are formed on the same side as the side of the pixel regions 12b where the opening sections 233b are formed. The structure of the screen sections 232b is similar to that of the screen sections 232a.

The screen sections 232c are formed on the same side as the side of the pixel regions 12c where the opening sections 233c are formed. Screen sections 232c are formed near top right and bottom right corners of a pixel region 12a in FIG. 12. Since the screen sections 232c are thus formed, the opening section 233c has a width l4 smaller than the width l of the opening section 233c shown in FIG. 10. The screen sections 232c and the opening section 233c are line symmetrical about an imaginary line extending in the horizontal direction of FIG. 12 through the center of the pixel region 12c. The screen sections 232d are formed on the same side as the side of the pixel regions 12d where the opening sections 233d are formed. The structure of the screen sections 232d is similar to that of the screen sections 232c.

The width l4 of the opening sections 233a, 233b, 233c, and 233d is similar to the width l3 of the opening sections 33a and 33b of the liquid crystal display element according to Modification 2 of the first embodiment.

In the present modification, the screen sections 232a are formed on both sides of the opening sections 233a, and screen sections 232b, 232c, and 232d are similarly formed on both sides of the opening sections 233b, 233c, and 233d, respectively. As a result, the width l4 of the opening sections 233a, 233b, 233c, and 233d is smaller than the width l of the opening sections 233a, 233b, 233c, and 233d shown in FIG. 10. The liquid crystal display element of the present modification is more effective than the liquid crystal display element 206 in limiting the movement of the liquid crystal in the pixel regions 12a, 12b, 12c, and 12d. Therefore, the liquid crystal display element of the present modification is more effective than the liquid crystal display element 206 in preventing a change in a state of display attributable to pressing or bending of the display surface or an abrupt temperature change. Movement of the liquid crystal in the pixel regions 12a, 12b, 12c, and 12d can be more effectively limited, the smaller the width l4 of the opening sections 233a, 233b, 233c, and 233d.

Third Embodiment

Figure 13A:
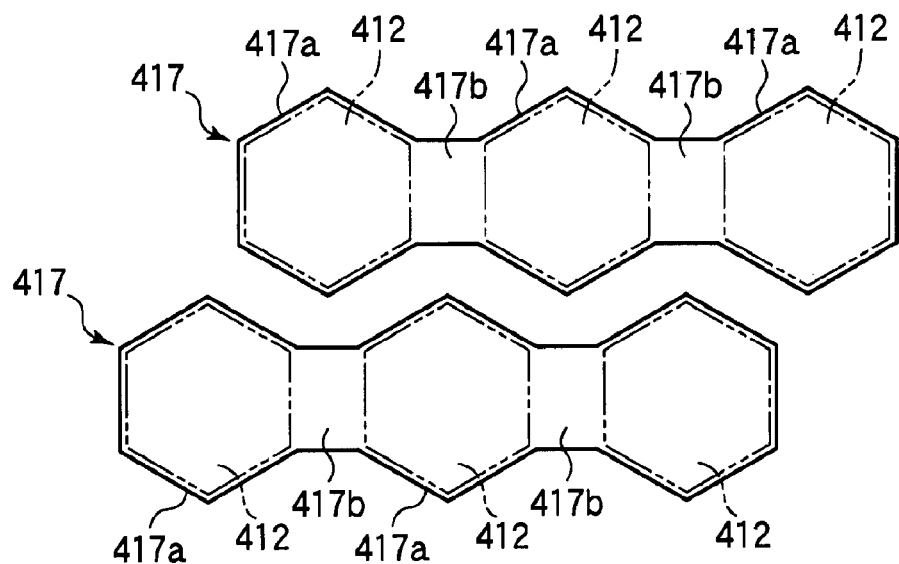
FIGS. 13A and 13B are plan views of scan electrodes 417 and data electrodes 419 of a liquid crystal display element 406 according to a third embodiment of the invention taken in the normal direction of substrate surfaces of the element.
Figure 13B:
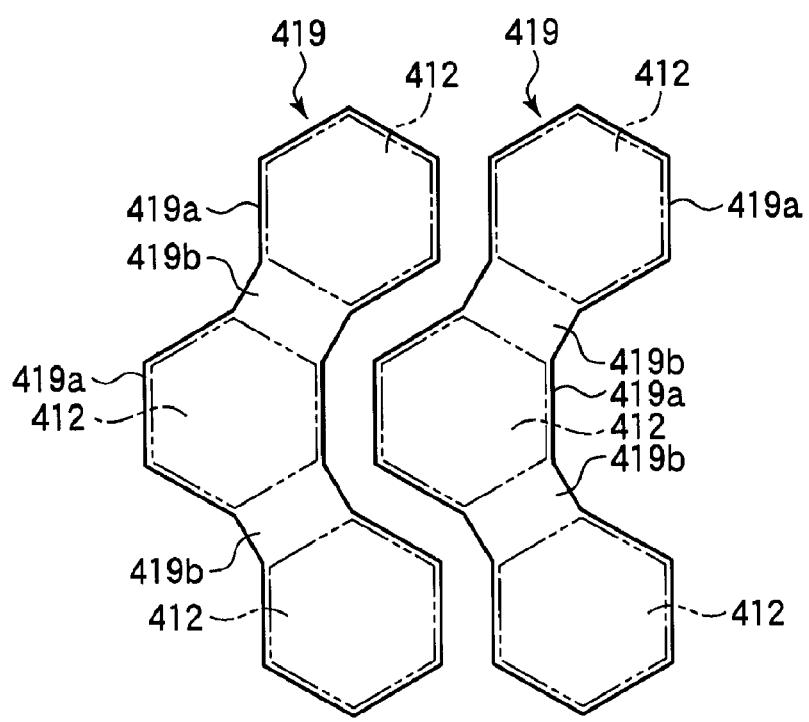

A liquid crystal display element according to a third embodiment of the invention will now be described with reference to FIGS. 13A to 15. FIG. 13A is a plan view of scan electrodes 417 of the liquid crystal display element of the present embodiment taken in the normal direction of substrate surfaces of the element. FIG. 13B is a plan view of data electrodes 419 of the liquid crystal display element of the present embodiment taken in the normal direction of the substrate surfaces.

A plurality of scan electrodes 417 are formed on a surface of a bottom substrate 9 facing a top substrate so as to extend in parallel with each other. As shown in FIG. 13A, the scan electrodes 417 have a structure formed by alternately disposing regular hexagonal portions 417a and rectangular portions 417b. The plurality of regular hexagonal portions 417a and the plurality of rectangular portions 417b are disposed in a linear pattern. One edge of a regular hexagonal portion 417a is contiguous with one edge of a rectangular portion 417b. The edge of the regular hexagonal portion 417a opposite to the mentioned edge is contiguous with an edge of another rectangular portion 417b.

A plurality of data electrodes 419 are formed on a surface of a top substrate 7 facing the bottom substrate so as to extend in substantially parallel with each other. When viewed in the normal direction of the substrate surfaces, the plurality of data electrodes substantially perpendicularly intersect the plurality of scan electrodes 417. As shown in FIG. 13B, the data electrodes 419 have a structure formed by alternately disposing regular hexagonal portions 419a and rectangular portions 419b. The plurality of regular hexagonal portions 419a are disposed in a zigzag pattern. One edge of a regular hexagonal portion 419a is contiguous with one edge of a rectangular portion 419b. Another edge of the regular hexagonal portion 419a located next to an edge adjacent to the mentioned edge is contiguous with an edge of another rectangular portion 419b.

When viewed in the normal direction of the substrate surfaces, the positions of the regular hexagonal portions 417a of the scan electrodes 417 coincide with the positions of the regular hexagonal portions 419a of the data electrodes 419. Regions where the regular hexagonal portions 417a and the regular hexagonal portions 419a overlap each other when viewed in the normal direction of the substrate surfaces constitute pixel regions 412. As shown in FIGS. 13A and 13B, the pixel regions 412 are substantially regular hexagonal when viewed in the normal direction of the substrate surfaces. The pixel regions 412 have six edges. The plurality of pixel regions 412 are formed in a honeycomb structure (a structure formed by disposing regular hexagons in the form of a grid).

FIG. 14 is a plan view of a liquid crystal display element 406 according to the present embodiment, and it is a schematic view of pixel regions 412a and 412b and a wall structure 431 taken in the normal direction of substrate surfaces of the element 406. The liquid crystal display element 406 of the present embodiment has a structure formed by periodically disposing pixel regions 412a and 412b, wall structure 431, opening sections 433a and 433b, and a channel 451 as shown in FIG. 14. Referring to FIG. 14, each couple of pixel regions 412a and 412b is disposed such that they are adjacent to each other in the horizontal direction of FIG. 14.

Each pixel region 412a is surrounded by the wall structure 431 except on a right side and a bottom right side thereof in FIG. 14. Each pixel region 412b is surrounded by the wall structure 431 except on a left side and a top left side thereof in FIG. 14. A channel 451 for allowing a cholesteric liquid crystal to flow is formed between each pair of pixel regions 412a and 412b adjacent to each other. The channels 451 are formed outside the pixel regions 412a and 412b. The channels 451 overlap a part of each of the pixel regions 412a and 412b (the part constituting about one-sixths of each region in terms of areal ratio). The channels 451 linearly extend. The liquid crystal display element 406 is similar in configuration to the liquid crystal display element 6 of the first embodiment except for the above-described point.

An opening section 433a, which is an opening of the wall structure 431, is formed on sides of a pixel region 412a facing a channel 451 (a right side and a bottom right side in FIG. 14). An opening section 433b, which is an opening of the wall structure 431, is formed on sides of a pixel region 412b facing a channel 451 (a left side and a top left side as shown in FIG. 14). One opening section 433a is formed for each pixel region 412a, and one opening section 433b is formed for each pixel region 412b. The opening sections 433a and 433b are disposed to face each other across the channels 451 with an offset of a half pitch. The pixel regions 412a are connected to the channels 451 through the opening sections 433a. The pixel regions 412b are connected to the channels 451 through the opening sections 433b.

In the present embodiment, the channels 451 overlap a part of the pixel regions 412a and 412b. Therefore, the liquid crystal can move where the pixel regions 412a and 412b overlap the channels 451. However, since a major part of each of pixel regions 412a and 412b does not overlap a channel 451, a significant effect of suppressing the movement of the liquid crystal in the pixel regions 412a and 412b can be achieved. In the liquid crystal display element 406 of the present embodiment, any change in a state of display can be prevented even when a display surface of the element 406 is pressed or bent or when there is an abrupt temperature change.

(Modification)

Figure 15:
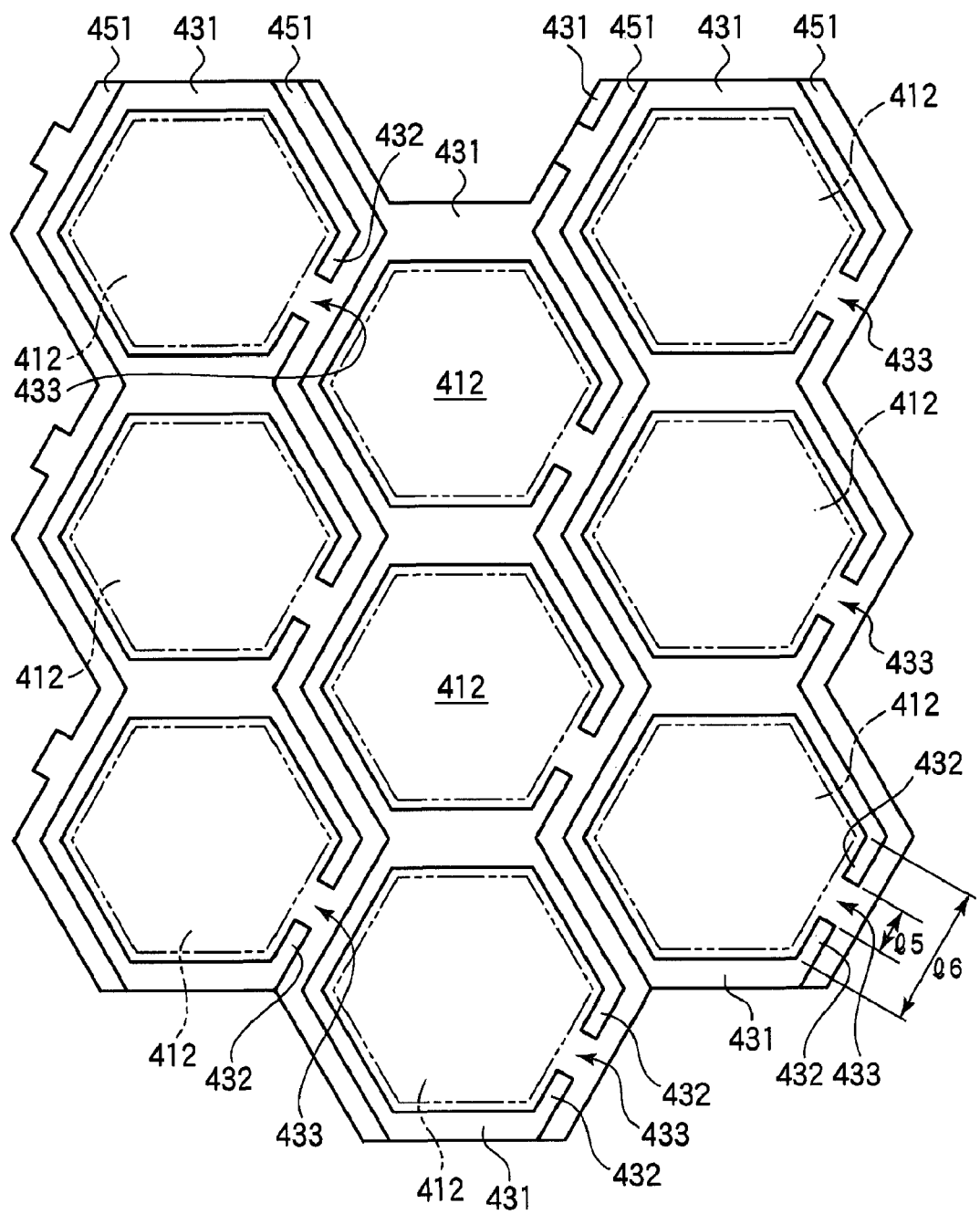
FIG. 15 is an illustration of a modification of the liquid crystal display element 406 according to the third embodiment of the invention.
Figure 16:
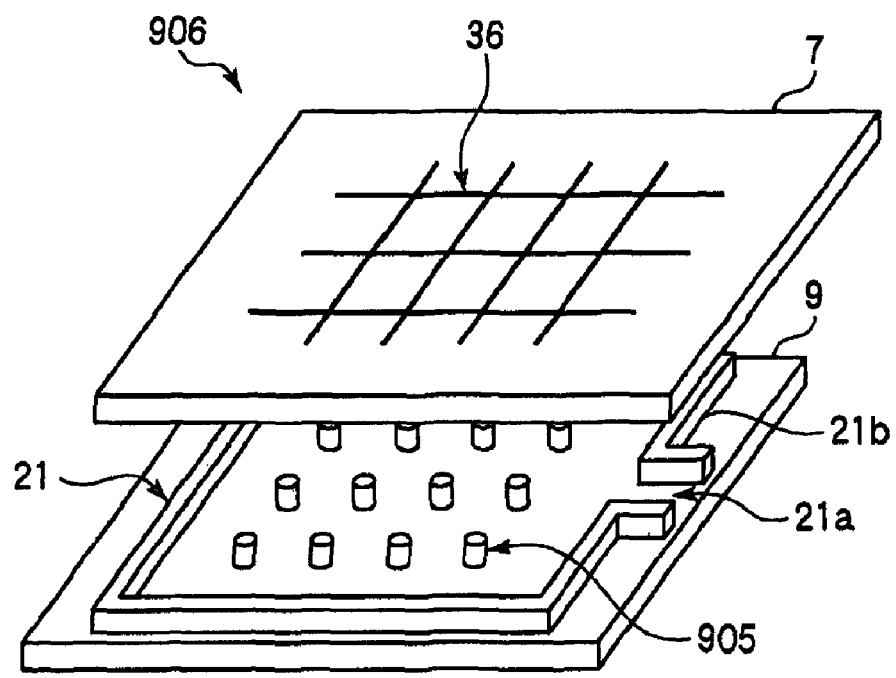
FIG. 16 is an exploded perspective view of a liquid crystal display element 906 according to the related art showing a cell structure of the same.

A liquid crystal display element according a modification of the present embodiment will now be described with reference to FIG. 15. In the following description, components which are identical in functions and operations between the present modification and the liquid crystal display element 406 shown in FIGS. 13 and 14 will be indicated by like reference numerals and will not be described in detail. FIG. 15 is a plan view of the liquid crystal display element of the present modification, and it is a schematic view of pixel regions 412 and a wall structure 431 taken in the normal direction of substrate surfaces of the element.

The liquid crystal display element of the present modification has a structure formed by periodically disposing pixel regions 412, wall structures 431, screen sections 432, opening sections 433, and channels 451 as shown in FIG. 15. Sides of a pixel region 412 are surrounded by a wall structure 431 except on a bottom right side thereof in FIG. 15. A channel 451 is formed between each pair of pixel regions 412 adjacent to each other in the horizontal direction of FIG. 15. The channels 451 are laterally surrounded by the wall structures 431. The channels 451 extend in a zigzag pattern. The channels 451 are formed outside the pixel regions 412.

An opening section 433, which is an opening in a wall structure 431, is formed on a side of a pixel region 412 facing a channel 451 (a bottom right side in FIG. 15). One opening 433 is formed for each pixel region 412. The pixel regions 412 are connected to the channels 451 through the opening sections 433.

The wall structures 431 have screen sections 432. The screen sections 432 are formed integrally with the wall structures 431. The screen sections 432 are formed from the same material, at the same manufacturing step, and in the same layer as the wall structures 431. The screen sections 432 are formed on the same side as the side of the pixel regions 412 where the opening sections 433 are formed. The screen sections 432 are formed on both sides of the opening sections 433. Since the screen sections 432 are thus formed, the opening sections 433 have a width l5 which is smaller than a width l6 of one side of the pixel regions 412. The liquid crystal display element of the present modification is similar in configuration to the liquid crystal display element 406 except for the above-described points.

In the present modification, the channels 451 are formed outside the pixel regions 412, and the channels 451 and the pixel regions 412 do not overlap each other. The opening sections 433 are formed at only one side of the pixel regions 412, and the screen sections 432 are formed on both sides of the opening sections 433. Therefore, the width l5 of the opening sections 433 is smaller than the width of the opening sections 433a and 433b shown in FIG. 14. In the liquid crystal display element of the present modification, movement of the liquid crystal in the pixel regions 412 can be more effectively limited when compared to that in the liquid crystal display element 406. In the liquid crystal display element of the present modification, a change in a state of display can be more effectively prevented compared to the liquid crystal display element 406.

In the above-described embodiments, when the width of the liquid crystal channels are smaller or the width of the opening sections are smaller, it is expected that a longer liquid crystal injection time will be required. However, the liquid crystal display elements can be fabricated in an acceptable processing time by increasing the temperature of the liquid crystal when injecting the liquid crystal to reduce the viscosity of the same.

The invention is not limited to the above-described embodiments and may be modified in various ways.

For example, the invention can be advantageously used in applications where pixels are in a delta arrangement.

Although the above embodiments have been described as passive matrix (simple matrix) liquid crystal display elements by way of example, the invention is not limited to such elements and may be applied to active matrix liquid crystal display elements in which a switching device such as a thin film transistor (TFT) or a thin film diode (TFD) is provided at each pixel.

Although the above embodiments have been described as liquid crystal display elements utilizing cholesteric liquid crystals by way of example, the invention is not limited to such elements and may be applied to liquid crystal display elements utilizing other types of liquid crystals having the property of memorizing a state of display.

In the above described embodiments, the shape of pixel region is a regular hexagon or square when viewed in the normal direction of substrate surfaces. The invention is not limited to such shapes and advantageously used in applications where pixels have other shapes.

Although the wall structures 31 and 431 of the above embodiments are not formed in pixel regions, the invention is not limited to such a configuration. It is not essential to form the wall structures 31 and 431 completely outside pixel regions. The wall structures 31 and 431 may be formed inside pixel regions at peripheral parts of the pixel regions to provide the wall structures 31 and 431 with strength and stable bonding properties.

Although the second wall structure in the above-described embodiment is an enclosing structure having a substantially rectangular shape, the invention not limited to such a structure. When the second wall structure is used in combination of the seal material 21, it is not essential that the second wall structure is an enclosing structure. In such a case, the shape of the second wall structure may comform with the shape of the wall structure.

Further, columnar or prismatic spacers may be provided in pixel regions to be used in combination with the wall structure. Such a configuration will be advantageous not only in preventing movement of a liquid crystal but also in suppressing deformation of pixels.

Although one opening section is formed at each pixel region in the above-described embodiments, the invention is not limited to such a configuration. Two or more opening sections may be formed at each pixel region. For example, in the liquid crystal display element 6 shown in FIG. 4, a wall structure may be formed in a part of an opening section 33*a* to split the opening section 33*a* into two parts. Thus, two opening sections 33*a* are formed at each pixel region 12*a*. The channels 51 are formed outside the pixel regions 12*a* also in such a configuration. Therefore, the configuration will provide the same advantages as those of the above-described embodiments.

The invention is advantageous not only for liquid crystals but also for other materials which have memory characteristics but may undergo a change in a state of display because of a movement attributable to pressing, bending or a temperature change.

Liquid crystal display elements 6, 206, and 406 having a single-layer structure and a liquid crystal display element 1 having a three-layer structure formed by stacking B, G, and R display portions 6*b*, 6*g*, and 6*r* have been described above as exemplary embodiments of the invention. However, the invention is not limited to such elements and may be applied to liquid crystal display elements having a structure including two or more layers formed by stacking the liquid crystal display element 6, 206, or 406.

Black-and-white display of high quality can be achieved by a liquid crystal display element having a two-layer structure in which the color of light reflected by a cholesteric liquid crystal in the top layer (which is located on the side of the element where a display surface is provided) is in a complementary relationship with the color of light reflected by a cholesteric liquid crystal in the bottom layer. Such a liquid crystal display element displays white when both of the cholesteric liquid crystal in the top layer and the cholesteric liquid crystal in the bottom layer are in the planar state and displays black when both of the cholesteric liquid crystals are in the focal conic state. While various combinations of complementary colors are available, white can be displayed with relatively high quality by a combination of blue and yellow.

As apparent from the above description of the embodiments of the invention, a change in a state of display can be effectively prevented in the liquid crystal display element 1 or 6 utilizing cholesteric liquid crystals having bistability when the display surfaces is pressed or bent or there is an abrupt temperature change. Further, since the liquid crystal display elements 1 and 6 utilizing cholesteric liquid crystals have improved strength against pressing or bending, the elements 1 and 6 can be provided with flexibility.

What is claimed is:

1. A display element comprising:
   a pair of substrates disposed opposite to each other;
   a liquid crystal enclosed between the pair of substrates;
   a wall structure which is formed to surround a pixel region and which is in contact with both of the pair of substrates; and
   an opening section which is an opening provided in a part of the wall structure and provided in only one side of the pixel region to allow the liquid crystal to flow out of the pixel region,
   wherein the opening section is the only opening provided on sides of the pixel region.

2. The display element according to claim 1, wherein a plurality of the pixel regions are disposed in a lattice pattern.

3. The display element according to claim 2, wherein one opening section is formed at each of the pixel regions.

4. The display element according to claim 3, comprising a channel formed outside the pixel regions to allow the liquid crystal to flow, wherein the channel is formed between a pair of the pixel regions and wherein a pair of the opening sections is disposed to face each other across the channel.

5. The display element according to claim 3, comprising a channel formed outside the pixel regions to allow the liquid crystal to flow, wherein the channel is formed between a pair of the pixel regions and wherein the opening section is not disposed to face another opening section across the channel.

6. The display element according to claim 4, comprising a layer for blocking reflected light from the channel provided on a viewing side of the channel.

7. The display element according to claim 4 further comprising a seal material which surrounds the pixel regions and the wall structure and which includes an injection port for injecting the liquid crystal, wherein the pixel regions are connected to the injection port through the channel.

8. The display element according to claim 1, wherein the opening section is formed between an adjoining pair of the plurality of pixel regions.

9. The display element according to claim 1, wherein the wall structure is bonded to both of the pair of substrates.

10. The display element according to claim 1, wherein the pixel regions have a plurality of sides and wherein the wall structure includes a screen section formed on the same side where the opening is formed.

11. The display element according to claim 1, wherein the liquid crystal has memory characteristics.

12. The display element according to claim 11, wherein the liquid crystal is a cholesteric liquid crystal.

13. The display element according to claim 1, further comprising a pair of electrodes formed on the surfaces of the pair of substrates facing each other, respectively, wherein the pixel regions are regions where the pair of electrodes overlap each other when viewed in the normal direction of the substrate surfaces.

14. The display element according to claim 1, wherein the pixel regions are substantially rectangular when viewed in the normal direction of the substrate surfaces.

15. The display element according to claim 1, wherein the pixel regions are substantially regular hexagonal when viewed in the normal direction of the substrate surfaces.

16. A display element comprising a structure including two or more layers formed by stacking display elements according to claim 1.

17. A display element comprising a structure including two layers formed by stacking display elements according to claim 1, wherein the color of light reflected by the liquid crystal in one of the layers is in a complementary relationship with the color of light reflected by the liquid crystal in the other layer.

18. A display element comprising a structure including three layers formed by stacking display elements according to claim 1, wherein the liquid crystal in one of the layers reflects blue light; the liquid crystal in another layer reflects green light; and the liquid crystal in the remaining layer reflects red light.

19. Electronic paper displaying images, comprising a display element according to claim 1.

20. An electronic terminal apparatus displaying images, comprising a display element according to claim 1.

* * * * *